US012687956B2

(12) United States Patent
Sun

(10) Patent No.: US 12,687,956 B2
(45) Date of Patent: Jul. 21, 2026

(54) INTERFACE DISPLAY METHOD AND APPARATUS, DEVICE, AND STORAGE MEDIUM FOR DISPLAYING VIRTUAL ITEMS OF A VIRTUAL OBJECT

(71) Applicant: Tencent Technology (Shenzhen) Company Limited, Shenzhen (CN)

(72) Inventor: Shuo Sun, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 219 days.

(21) Appl. No.: 18/197,207

(22) Filed: May 15, 2023

(65) Prior Publication Data

US 2023/0280873 A1     Sep. 7, 2023

Related U.S. Application Data

(63) Continuation of application No. PCT/CN2022/099201, filed on Jun. 16, 2022.

(30) Foreign Application Priority Data

Jul. 21, 2021   (CN) .......................... 202110827352.4
Dec. 31, 2021   (CN) .......................... 202111668326.8

(51) Int. Cl.
G06F 3/0481          (2022.01)
A63F 13/69           (2014.01)
(52) U.S. Cl.
CPC ............ G06F 3/0481 (2013.01); A63F 13/69 (2014.09)
(58) Field of Classification Search
None
See application file for complete search history.

(56) References Cited

U.S. PATENT DOCUMENTS 6,306,033 B1 * 10/2001 Niwa ...................... A63F 13/10
                                                            463/31
8,090,618 B1 *  1/2012 Chu ................... G06Q 30/0603
                                                            705/26.1
(Continued)

FOREIGN PATENT DOCUMENTS

CN          111821692 A     10/2020
CN          111905364 A     11/2020
(Continued)

OTHER PUBLICATIONS

Andrew Whalen https://www.newsweek.com/metro-exodus-weapons-list-customization-guide-all-guns-kalash-1332147 "'Metro Exodus' Weapons List and Customization Guide: Using Workbenches, Crafting Ammo and Picking the Right Attachments" Published Feb. 15, 2019 at 12:40 AM EST Updated Feb. 24, 2019 at 9:07 PM EST.*
(Continued)

*Primary Examiner* — Jason A Pringle-Parker
(74) *Attorney, Agent, or Firm* — Crowell & Moring LLP

(57) ABSTRACT

This application discloses an interface display method and apparatus, a device, and a storage medium, and belongs to the field of computer technologies. The method includes: displaying, by a terminal, a virtual item display interface, the virtual item display interface displaying a plurality of first virtual items, and the plurality of first virtual items corresponding to different parts of a controlled virtual object; comparing, by the terminal, the plurality of first virtual items with second virtual items owned by the controlled virtual object in response to a confirmation operation on the virtual item display interface; and displaying, by the terminal, a virtual item transaction interface in response to that no first virtual item exists in the second virtual items, the virtual item transaction interface being configured to obtain the first virtual items.

20 Claims, 7 Drawing Sheets

(56) References Cited

U.S. PATENT DOCUMENTS

| | | | | |
|---|---|---|---|---|
| 9,352,217 | B1 * | 5/2016 | Curtis | A63F 13/67 |
| 9,468,851 | B1 * | 10/2016 | Pieron | A63F 13/30 |
| 9,508,222 | B1 * | 11/2016 | McLellan | A63F 13/792 |
| 2008/0004093 | A1 * | 1/2008 | Van Luchene | G07F 17/32 463/1 |
| 2009/0149248 | A1 * | 6/2009 | Busey | A63F 13/12 463/43 |
| 2012/0142429 | A1 * | 6/2012 | Muller | A63F 13/69 463/42 |
| 2014/0274377 | A1 * | 9/2014 | Morel | A63F 13/48 463/31 |
| 2016/0206959 | A1 * | 7/2016 | Nelson | A63F 13/35 |

FOREIGN PATENT DOCUMENTS

| | | |
|---|---|---|
| CN | 112915547 A | 6/2021 |
| CN | 114053711 A | 2/2022 |
| JP | 2002-058045 A | 2/2002 |
| JP | 2008-71271 A | 3/2008 |
| JP | 2008-272124 A | 11/2008 |

OTHER PUBLICATIONS https://forum.enlisted.net/t/loadout-presets/18914 , Jul. 3, 2021 (Year: 2021).*

Office Action in Japanese Patent Application No. 2023-571194 dated Dec. 19, 2024, w/English translation, 13 pages.

"Replacement of clothes and change of hairstyles when wearing clothes that have been sent in byy Air" https://web.archive.org/web/20210410042745/https://www.pokemon.co.jp/ex/sword_shield/story/190905_01.html Nov. 15, 2019.

https://www.youtube.com/watch?v=u8YviprE37w; Feb. 23, 2018.

https://www.appbank.net12020101118/iphon1.-application11846847.php; Jan. 18, 2020.

https://donblog.net/ff7-3066.html; Mar. 14, 2021.

https://www.famitsu.com/news/201711/02144956.html; Nov. 2, 2017.

International Search Report and Written Opinion for PCT/CN2022/099201 mailed Sep. 14, 2022, including translations (15 pages).

Tao, Zisheng(Non-official translation: [Taobao Game of Life Documentary] Keywords Dress up to save your body?) https://www.bilibili.com/video/BV1iN411Z7eH?spm_id_from=333.337.search-card.all.click30.5 May 30, 2021 (May 30, 2021), 0 to 2 minutes and 20 seconds of the video in web page.

* cited by examiner

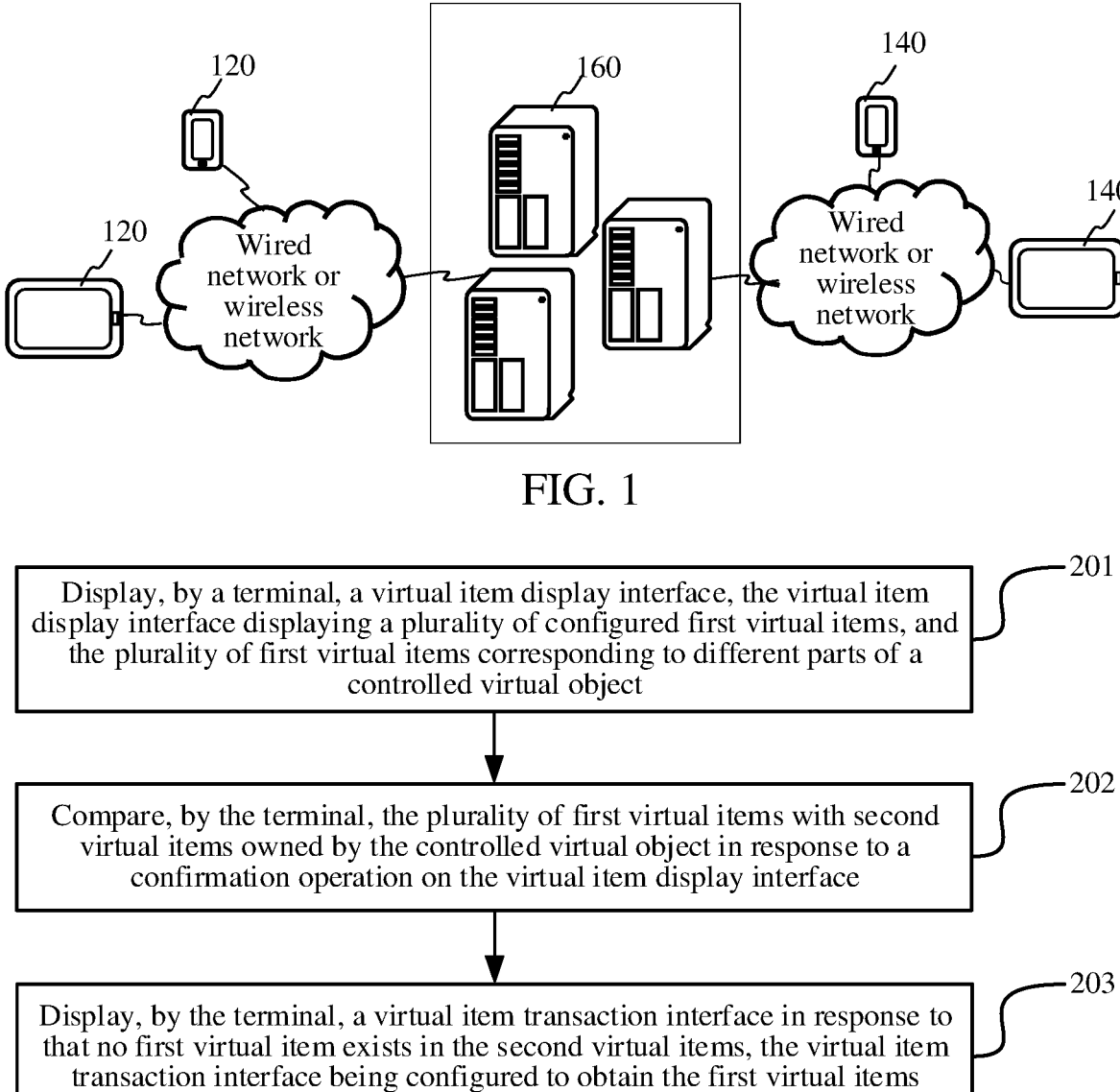

FIG. 1

| | |
|---|---|
| Display, by a terminal, a virtual item display interface, the virtual item display interface displaying a plurality of configured first virtual items, and the plurality of first virtual items corresponding to different parts of a controlled virtual object | 201 |
| Compare, by the terminal, the plurality of first virtual items with second virtual items owned by the controlled virtual object in response to a confirmation operation on the virtual item display interface | 202 |
| Display, by the terminal, a virtual item transaction interface in response to that no first virtual item exists in the second virtual items, the virtual item transaction interface being configured to obtain the first virtual items | 203 |

| Lack of virtual items | | | | | | |
|---|---|---|---|---|---|---|
| All | Main weapon | Server | Helmet | Carrying | | Refresh |

Articles                                          Price          ☐ Select all

| | Name | | |
|---|---|---|---|
| ☐ | Source | XXXXX | ☐ Purchase |

| | Name | | |
|---|---|---|---|
| ☐ | Source | XXXXX | ☐ Purchase |

| | Name | | |
|---|---|---|---|
| ☐ | Source | XXXXX | ☐ Purchase |

| Own:XXXX | | Ignore | Purchase |
|---|---|---|---|

604                              606          603

Virtual backpack

Temporary pack                    701

INTERFACE DISPLAY METHOD AND APPARATUS, DEVICE, AND STORAGE MEDIUM FOR DISPLAYING VIRTUAL ITEMS OF A VIRTUAL OBJECT

RELATED APPLICATION

This application is a continuation of International Patent Application No. PCT/CN2022/099201, filed on Jun. 16, 2022, which claims priority to Chinese Patent Application No. 202110827352.4, entitled "INTERFACE DISPLAY METHOD AND APPARATUS, DEVICE, AND STORAGE MEDIUM", filed on Jul. 21, 2021, and to Chinese Patent Application No. 202111668326.8, entitled "INTERFACE DISPLAY METHOD AND APPARATUS, DEVICE, AND STORAGE MEDIUM", filed on Dec. 31, 2021. The contents of International Patent Application No. PCT/CN2022/099201, Chinese Patent Application No. 202110827352.4, and Chinese Patent Application No. 202111668326.8 are each incorporated by reference in their entirety.

FIELD OF THE TECHNOLOGY

This application relates to the field of computer technologies, and in particular to an interface display method and apparatus, a device, and a storage medium.

BACKGROUND OF THE DISCLOSURE

With the development of multimedia technologies and the diversification of terminal functions, more and more games can be played on the terminal. A shooting game is a popular game, and during the game process, a user can control a virtual object to fight with virtual objects controlled by other users in a virtual scene.

In the related art, before the game starts, the user needs to select a virtual item used in the game for the controlled virtual object, for example, the user selects a virtual firearm or a virtual armor for the controlled virtual object.

SUMMARY

Embodiments of this application provide an interface display method and apparatus, a device, and a storage medium, which can improve the efficiency of human-computer interaction. The technical solutions are as follows:

In one aspect, an interface display method is provided, and the method includes:

displaying, by a terminal, a virtual item display interface, the virtual item display interface displaying a plurality of first virtual items, and the plurality of first virtual items corresponding to different parts of a controlled virtual object;

comparing, by the terminal, the plurality of first virtual items with second virtual items owned by the controlled virtual object in response to a confirmation operation on the virtual item display interface; and displaying, by the terminal, a virtual item transaction interface in response to that no first virtual item exists in the second virtual items, the virtual item transaction interface being configured to obtain the first virtual items.

In another aspect, an interface display apparatus is provided, and the apparatus includes:

a first display module, configured to display a virtual item display interface, the virtual item display interface displaying a plurality of first virtual items, and the plurality of first virtual items corresponding to different parts of the controlled virtual object;

a comparing module, configured to compare the plurality of first virtual items with the second virtual items owned by the controlled virtual object in response to the confirmation operation on the virtual item display interface; and a second display module, configured to display a virtual item transaction interface in response to that any of the first virtual items does not exist in the second virtual items, the virtual item transaction interface being configured to obtain the first virtual items.

In some embodiments, the virtual item display interface includes a plurality of slot positions, and the plurality of first virtual items are respectively displayed in the plurality of slot positions, the apparatus further includes:

a virtual item editing interface display module, configured to display a virtual item editing interface in response to a selection operation on any one slot position in the plurality of slot positions, the virtual item editing interface being configured to adjust the first virtual items corresponding to the slot positions.

In some embodiments, the virtual item editing interface includes a virtual item selection list, the virtual item selection list displaying a plurality of candidate virtual items, and the plurality of candidate virtual items being virtual items corresponding to the slot positions, and the apparatus further includes:

a candidate virtual item display module, configured to display the candidate virtual item in the slot position in response to that any one candidate virtual item in the plurality of candidate virtual items is selected.

In some embodiments, the virtual item editing interface includes a virtual item selection list, the virtual item selection list displaying a plurality of candidate virtual items, and the plurality of candidate virtual items being virtual items corresponding to the slot positions, and the apparatus further includes:

a first sub virtual item updating module, configured to display a sub virtual item editing interface in the virtual item editing interface in response to that any one candidate virtual item in the plurality of candidate virtual items is selected and the candidate virtual item is a virtual item of a target type, a plurality of sub virtual items corresponding to the candidate virtual item being displayed in the sub virtual item editing interface, and the virtual item of the target type and the corresponding sub virtual items having a nested relationship; and update the sub virtual items into sub virtual items corresponding to the adjustment operation in response to an adjustment operation on any one sub virtual item in the plurality of sub virtual items.

In some embodiments, the first sub virtual item updating module is configured to display a sub virtual item selection list corresponding to the sub virtual items in response to the selection operation on any one sub virtual item in the plurality of sub virtual items, the sub virtual item selection list displaying a plurality of candidate sub virtual items corresponding to the sub virtual items; and update the sub virtual items by utilizing the target sub virtual item in response to that a target sub virtual item in the plurality of candidate sub virtual items is selected.

In some embodiments, the apparatus further includes:

a list storage module, configured to add the identifier of the first virtual item into a first list in response to that any of the first virtual items is the same as any second virtual items, the first list being configured to store the identifiers, which are queried in the second virtual items, of the first virtual items; and add the identifier of the first virtual item into a second list in response to that any of the first virtual items is different from the second virtual items, the second list being configured to store the identifiers, which are not queried in the second virtual items, of the first virtual items; and the second display module, configured to display the virtual item transaction interface in response to the identifier, which exists in the second list, of any of the first virtual items.

In some embodiments, the virtual item transaction interface displays at least one piece of item information of the first virtual item, the apparatus further includes:

an adding module, configured to add the first virtual item corresponding to the item information to a virtual warehouse of the controlled virtual object in response to a purchase operation based on any piece of item information.

In some embodiments, the adding module is configured to compare a first virtual resource quantity with a second virtual resource quantity in response to the purchase operation on any piece of item information, the first virtual resource quantity being the quantity of virtual resources indicated by the item information, and the second virtual resource quantity being the quantity of virtual resources owned by an account corresponding to the controlled virtual object; and add the first virtual item corresponding to the item information to the virtual warehouse of the controlled virtual object in response to that the second virtual resource quantity is greater than or equal to the first virtual resource quantity.

In some embodiments, the virtual item transaction interface displays at least one piece of item information of the first virtual item, the apparatus further includes:

a temporary pack adding module, configured to add the first virtual item corresponding to the item information to a temporary pack of the controlled virtual object in response to the purchase operation on any one piece of item information, the space occupied by the first virtual item corresponding to the item information being greater than the remaining space of the virtual warehouse of the controlled virtual object.

In some embodiments, the at least one item information is item information determined based on recommendation priority, the recommendation priority including at least one of the type priority of virtual resources, the quantity priority of virtual resources and the type priority of virtual items.

In some embodiments, the apparatus further includes:

an updating module, configured to update the virtual items which have been equipped by the controlled virtual object into the plurality of first virtual items in response to that the plurality of first virtual items are second virtual items owned by the controlled virtual object.

In some embodiments, the updating module is configured to add third virtual items which have been equipped by the controlled virtual object to the virtual warehouse of the controlled virtual object in response to the plurality of first virtual items being second virtual items owned by the controlled virtual object, the third virtual items being virtual items different from the corresponding first virtual items; and determine the plurality of first virtual items in the virtual warehouse as the virtual items equipped by the controlled virtual object.

In some embodiments, the apparatus further includes:

a modal updating module, configured to update the model of the controlled virtual object by utilizing models of the plurality of first virtual items.

In some embodiments, the plurality of first virtual items include a virtual item of a target type, and the apparatus further includes:

a second sub virtual item updating module, configured to, in response to the plurality of first virtual items being second virtual items owned by the controlled virtual object and the controlled virtual object has been equipped with the virtual item of the target type, the terminal comparing the first sub virtual items with the second sub virtual items, the first sub virtual items being sub virtual items corresponding to the virtual item of the target type in the first virtual items, the second sub virtual items being sub virtual items corresponding to the virtual item of the target type, which has been equipped by the controlled virtual object, and the virtual item of the target type and the corresponding sub virtual items having a nested relationship; wherein the second sub virtual items and the first sub virtual items are the same, the terminal skipping updating the sub virtual items accommodated by the virtual item of the target type; and when second sub virtual items different from the corresponding first sub virtual items exist in the second sub virtual items, the terminal updating the second sub virtual items by utilizing the corresponding first sub virtual items.

In some embodiments, the virtual item of the target type is a container-type virtual item, and the container-type virtual item is configured to accommodate corresponding sub virtual items.

In some embodiments, the apparatus further includes:

an updating module, configured to update the virtual items which have been equipped by the controlled virtual object by utilizing the first virtual items owned by the controlled virtual object in response to a closing operation on the virtual item transaction interface.

In some embodiments, the apparatus further includes:

a third display module, configured to display a virtual item configuration interface, the virtual item configuration interface is used for configuring the plurality of first virtual items; and the first display module is further configured to display the virtual item display interface in response to a confirmation operation on the virtual item configuration interface.

In another aspect, a computer device is provided, the computer device including one or more processors and one or more memories, the one or more memories storing at least one computer program, the computer program being loaded and executed by the one or more processors to implement the interface display method.

In another aspect, a computer-readable storage medium is provided, the computer-readable storage medium storing at least one computer program, the computer program being loaded and executed by the processor to implement the interface display method.

In another aspect, a computer program product or a computer program is provided, the computer program product or the computer program including a computer program code, the computer program code being stored in the computer-readable storage medium, the processor of the computer device reading the computer program code from the computer-readable storage medium, and the processor executing the computer program code, so that the computer device executes the interface display method.

By means of solutions provided by this embodiment of this application, no virtual items need to be picked one by one for the controlled virtual object, virtual items are directly selected for the controlled virtual object in batches on the basis of a virtual item display interface, if the controlled virtual object does not have a certain virtual item displayed in the virtual item display interface, the virtual item transaction interface is directly displayed, then corresponding virtual items may be obtained quickly by means of the virtual item transaction interface, and thus, the efficiency of human-computer interaction is improved.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 1 is a schematic diagram of an implementation environment used in an interface display method according to an embodiment of this application;

FIG. 2 is a flowchart of an interface display method according to an embodiment of this application;

DESCRIPTION OF EMBODIMENTS

Figure 3:
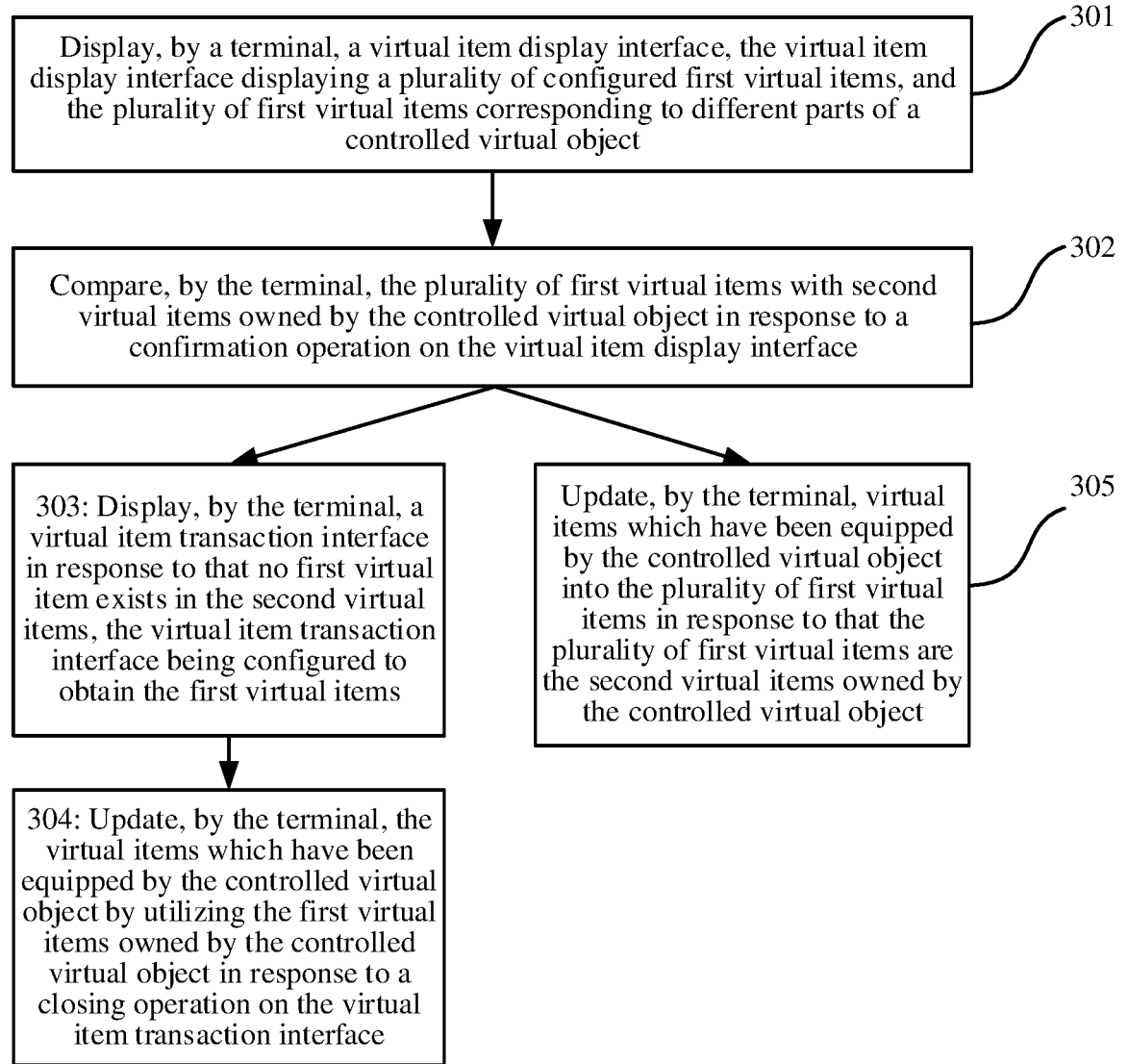
FIG. 3 is a flowchart of an interface display method according to an embodiment of this application.

In this application, the term "at least one" refers to one or more, the term "plurality" refers to two or more, for example, a plurality of virtual items refer to two or more virtual items. Virtual scene: refers to a virtual scene displayed (or provided) when an application program runs on a terminal. The virtual scene may be a semi-simulation semi-fictional virtual environment or a pure fictional virtual environment. The virtual scene may be any one of a two-dimensional virtual scene, a 2.5-dimensional virtual scene, or a three-dimensional virtual scene, and the dimension of the virtual scene is not limited in this embodiment of this application. For example, the virtual scene may include sky, land, ocean, and the like, the land may include environmental elements such as desert and city, and a user may control a virtual object to move in the virtual scene.

Virtual object: refers to a movable object in a virtual scene. The movable object may be a virtual character, a virtual animal, an animation character, and the like, such as: characters, animals, plants, oil drums, walls and rocks displayed in the virtual scene. The virtual object may be a virtual image in the virtual scene that is virtual to represent the user. The virtual scene may include a plurality of virtual objects, and each virtual object has a shape and a volume in the virtual scene, and occupies some space in the virtual scene.

In some embodiments, the virtual object is a user character controlled by an operation on a client, or an artificial intelligence (AI) set in a virtual scene battle by training, or a non-player character (NPC) set in the virtual scene. In some embodiments, the virtual object is a virtual character playing a game in the virtual scene. In some embodiments, the number of virtual objects participating in interaction in the virtual scene is preset or dynamically determined according to the number of clients participating in the interaction.

Using a shooting game as an example, in the virtual scene, the user may control the virtual object to fall freely, glide, or fall after a parachute is opened in the sky; or to run, jump, creep, bend forward in the land; or control the virtual object to swim, float, or dive in the ocean. Certainly, the user may further control the virtual object to ride in a virtual vehicle to move in the virtual scene, for example, the virtual vehicle may be a virtual car, a virtual aircraft, a virtual yacht, and the like, and the foregoing scenes are used as an example only herein, which is not specifically limited in this embodiment of this application. The user can also control the virtual object to interact with other virtual objects in a battle mode and the like by means of an interactive item in the game, for example, the interactive item may be a throwing interactive item such as a virtual grenade, a virtual cluster grenade and a virtual sticky grenade (called "sticky grenade" for short), and may also be a shooting interactive item such as a virtual machine gun, a virtual pistol and a virtual rifle, and the type of the interactive item is not specifically limited in this application.

FIG. 1 is a schematic diagram of an implementation environment used in an interface display method according to this embodiment of this application, referring to FIG. 1, the implementation environment includes: a first terminal 120, a second terminal 140, and a server 160.

The first terminal 120 is installed and operated with an application program supporting the display of the virtual scene. In some embodiments, the application program is any one of a first-person shooting game (FPS), a third-person shooting game, a virtual reality application program, a three-dimensional map program, or a multiplayer matchup survival game. The first terminal 120 is a terminal used by a first user, and the first user uses the first terminal 120 to operate a controlled virtual object located in the virtual scene to perform activities, the activities including but not limited to: at least one of adjusting body postures, crawling, walking, running, riding, jumping, driving, picking, shooting, attacking and throwing. Illustratively, the controlled virtual object is a first virtual character, like a simulated character or a cartoon character.

The terminal 120 and the second terminal 140 are connected to the server 160 by using a wireless network or a wired network.

The second terminal 140 is installed and operated with an application program supporting the display of the virtual scene. In some embodiments, the application program is any one of a FPS, a third-person shooting game, a virtual reality application program, a three-dimensional map program, or a multiplayer matchup survival game. The second terminal 140 is a terminal used by a second user, and the second user uses the second terminal 140 to operate another virtual object located in the virtual scene to perform activities, the activities including but not limited to: at least one of adjusting body postures, crawling, walking, running, riding, jumping, driving, picking, shooting, attacking and throwing. Illustratively, the virtual object controlled by the second terminal 140 is a second virtual character, like a simulated character or a cartoon character.

In some embodiments, the virtual object controlled by the first terminal 120 and the virtual object controlled by the second terminal 140 are located in the same virtual scene, and at the moment, the virtual object controlled by the first terminal 120 can interact with the virtual object controlled by the second terminal 140 in the virtual scene. In some embodiments, the virtual object controlled by the first terminal 120 and the virtual object controlled by the second terminal 140 are in an adversarial relationship, for example, the virtual object controlled by the first terminal 120 and the virtual object controlled by the second terminal 140 belong to different teams and organizations, and the virtual objects in the adversarial relationship may interact with each other in a shooting manner on land.

In some embodiments, the application program installed on the first terminal 120 and the application program installed on the second terminal 140 are the same, or the application programs installed on the two terminals are application programs of the same type of different operating system platforms. The first terminal 120 refers broadly to one of a plurality of terminals, the second terminal 140 also refers broadly to one of a plurality of terminals, and this embodiment is exemplified only with the first terminal 120 and the second terminal 140. The device type of the first terminal 120 and the device type of the second terminal 140 are the same or different, and the device type includes: at least one of a smartphone, a tablet computer, a laptop computer, and a desktop computer. For example, the first terminal 120 and the second terminal 140 may be, but are not limited to, smartphones, or other handheld portable gaming devices. Technical solutions provided by this embodiment of this application can be applied to both the first terminal 120 and the second terminal 140, which is not limited in this embodiment of this application. For greater clarity and simplicity, in the following description, a terminal is referred to as a first terminal or a second terminal.

In some embodiments, the server 160 is a stand-alone physical server, or a server cluster or distributed system of a plurality of physical servers, or a cloud server that provides basic cloud computing services such as cloud services, cloud databases, cloud computing, cloud functions, cloud storage, web services, cloud communications, middleware services, domain name services, security services, content delivery network (CDN), and big data and artificial intelligence platforms, and the number of servers and the device types are not limited in this embodiment of this application.

After the implementation environment of this embodiment of this application is described, an application scenario of this embodiment of this application is described below. In the following description, the terminal is the first terminal 120 or the second terminal 140 in the above-described implementation environment, and the server is the above-described server 160.

Technical solutions provided by this embodiment of this application may be used in a scene of a shooting game, or in the scene of a fighting game, which is not limited in this embodiment of this application.

In one embodiment, the technical solutions provided by this embodiment of this disclosure are applied to the scene of a shooting game in which a user configures a plurality of first virtual items for a controlled virtual object by means of a virtual item display interface, that is, the user controls the controlled virtual object to configure equipment for shooting with virtual objects controlled by other users. In some embodiments, the plurality of first virtual items include a virtual firearm used by the controlled virtual object in the virtual scene, and the virtual firearm is a virtual item corresponding to a hand of the controlled virtual object. The plurality of first virtual items also include a virtual helmet of the controlled virtual object. In some embodiments, a virtual helmet can reduce injury when the controlled virtual object is hit, and of course, the virtual helmet is a virtual item that corresponds to the head of the controlled virtual object. The user can configure the plurality of first virtual items for the controlled virtual object ahead of time by means of the virtual item display interface, and the plurality of first virtual items are a plurality of virtual items that the user controls the controlled virtual object to use in the next game. Before the game starts, the user can view the plurality of configured first virtual items by means of the virtual item display interface. After the user confirms that there is no error with respect to the plurality of configured first virtual items, the terminal is controlled to install the plurality of first virtual items to the controlled virtual object by a confirmation operation on the virtual item display interface. When the virtual items owned by the controlled virtual object do not include any of the first virtual items, that is, the controlled virtual object does not have any of the configured first virtual items, then the terminal displays the virtual item transaction interface, and the user can purchase the first virtual items by means of the virtual item transaction interface.

In another embodiment, the technical solutions provided by this embodiment of this application are applied to the scene of a fighting game in which the user configures a plurality of first virtual items for the controlled virtual object by means of the virtual item display interface. That is, the user controls the controlled virtual object to configure equipment for fighting with virtual objects controlled by other users. In some embodiments, a virtual item in a fighting game can increase the attribute value of a virtual object. In some embodiments, the plurality of first virtual items include virtual boxing gloves used by the controlled virtual object in the virtual scene, and the virtual boxing gloves are virtual items corresponding to the hands of the controlled virtual object. The plurality of first virtual items further include a virtual hair band of the controlled virtual object. In some embodiments, the virtual hair band can increase the blood volume of the controlled virtual object, and of course, the virtual hair band is a virtual item corresponding to the head of the controlled virtual object. The user can configure the plurality of first virtual items for the controlled virtual object ahead of time by means of the virtual item display interface, and the plurality of first virtual items are a plurality of virtual items that the user controls the controlled virtual object to use in the next game. Before the game starts, the user can view the plurality of configured first virtual items by means of the virtual item display interface. After the user confirms that there is no error with respect to the plurality of configured first virtual items, the terminal is controlled to install the plurality of first virtual items to the controlled virtual object by a confirmation operation on the virtual item display interface. When the virtual items owned by the controlled virtual object do not include any of the first virtual items, that is, the controlled virtual object does not have any of the configured first virtual items, then the terminal displays the virtual item transaction interface, and the user can purchase the first virtual items by means of the virtual item transaction interface.

The technical solutions provided by this embodiment of this application can be applied to the scene of the above-described shooting game and the above-described fighting game, as well as in other games that require virtual items, which is not limited in this embodiment of this application.

After the implementation environment and application scenarios of this embodiment of this application are introduced, the technical solutions provided by this embodiment of this application are described below.

FIG. 2 is a flowchart of an interface display method according to an embodiment of this application, referring to FIG. 2, the method includes:

201: Display, by a terminal, a virtual item display interface, the virtual item display interface displaying a plurality of first virtual items, and the plurality of first virtual items corresponding to different parts of the controlled virtual object.

The virtual item display interface is a functional interface of a game application. A user can configure virtual items for the controlled virtual object ahead of time by means of the virtual item display interface, and the plurality of first virtual items are a plurality of virtual items configured ahead of time. The plurality of first virtual items corresponding to different parts of the controlled virtual object refers to that one first virtual item corresponds to one body part of the controlled virtual object. For example, if one first virtual item is a virtual firearm, then the first virtual item is a virtual item corresponding to a hand of the controlled virtual object.

202: Compare, by the terminal, the plurality of first virtual items with second virtual items owned by the controlled virtual object in response to a confirmation operation on the virtual item display interface.

The confirmation operation on the virtual item display interface refers to a confirmation operation on the plurality of configured first virtual items. The confirmation operation on the virtual item display interface includes any one of the following manners: a click operation of a confirmation control displayed on the virtual item display interface, or a target gesture performed on the virtual item display interface, which is not limited in this embodiment of this application. A process of comparing the plurality of first virtual items with the second virtual items owned by the controlled virtual object is a process of confirming whether the controlled virtual object has all the configured first virtual items.

In the above step 202, the terminal compares the plurality of first virtual items with the second virtual items as an example. In other possible implementation modes, the server may also compare the plurality of first virtual items with the second virtual items. That is, in response to the confirmation operation on the virtual item display interface, the terminal sends a comparison request to the server, where the comparison request carries the identifiers of the plurality of first virtual items. After the server receives the comparison request, the identifiers of the plurality of first virtual items are obtained from the comparison request, the identifiers of the plurality of first virtual items are compared with the second virtual items owned by the controlled virtual object, and the comparison result is sent to the terminal, so that the calculation amount of the terminal can be reduced, and the phenomena of terminal heating and jamming are reduced.

The number of the second virtual items owned by the controlled virtual object may be one or more, which is not limited in this embodiment of this application.

203: Display, by the terminal, the virtual item transaction interface in response to that any of the first virtual items does not exist in the second virtual items the virtual item transaction interface being configured to obtain the first virtual items.

Any of the first virtual items does not exist in the second virtual items, that is, the controlled virtual object does not have a certain configured first virtual item, and the user can obtain the first virtual items by means of the virtual item transaction interface.

In event that the controlled virtual object has a second virtual item, any of the first virtual items does not exist in the second virtual items, which means that at least one first virtual item is different from the second virtual items. In event that the controlled virtual object has a plurality of second virtual items, any of the first virtual items does not exist in the second virtual items, which means that at least one first virtual item is different from each second virtual item.

By means of solutions provided by this embodiment of this application, no virtual items need to be picked one by one for the controlled virtual object. Virtual items are directly selected for the controlled virtual object in batches on the basis of a virtual item display interface. If the controlled virtual object does not have a certain virtual item displayed in the virtual item display interface, and the virtual item transaction interface is directly displayed, then corresponding virtual items may be obtained quickly by means of the virtual item transaction interface, and thus, the efficiency of human-computer interaction is improved.

The following describes additional details of the technical solutions provided by this embodiment.

FIG. 3 is a flowchart of an interface display method according to an embodiment of this application. Referring to FIG. 3, the method includes:

301: Display, by a terminal, a virtual item display interface, the virtual item display interface displaying a plurality of first virtual items, and the plurality of first virtual items corresponding to different parts of the controlled virtual object.

The controlled virtual object is a terminal-controlled virtual object, and a user can control the controlled virtual object to execute different actions in the virtual scene by means of the terminal. In some embodiments, the plurality of first virtual items may be understood as a plurality of predetermined first virtual items, and the plurality of first virtual items may be referred to as a predetermined template. In some embodiments, the plurality of first virtual items include virtual backpacks, and the virtual backpacks are configured to store virtual medicine or virtual ammunition, and the like. In some embodiments, the plurality of first virtual items are all virtual items that can be brought into the game.

In some embodiments, the terminal may have one or more virtual items, where the owned virtual items are obtained by exchanging virtual resources in a game consumed by the user, or are issued by a server in a form of awards based on an account level promotion of the user, or are virtual items provided based on a current game stage or a game mode. a source of the Virtual items in this embodiment may come from any of various non-limiting sources. For example, the virtual resources may be in-game virtual currency, or the like.

In some embodiments, for a shooting game, the plurality of first virtual items displayed in the virtual item display interface include, as non-limiting examples, a virtual firearm, a virtual helmet, a virtual mask, a virtual body armor, a virtual grenade, and the like. The virtual firearm is divided into a main weapon and an auxiliary weapon. The main weapon includes a virtual sniper gun, a virtual rifle, a virtual machine gun and the like. The auxiliary weapon includes a virtual pistol, a virtual knife and the like. For a fighting game, the plurality of first virtual items displayed in the virtual item display interface include, as non-limiting examples, a virtual weapon, a virtual helmet, a virtual armor, a virtual shoe, a virtual pendant, and the like. In the fighting game, different virtual items can provide different attribute additions for the controlled virtual object. For example, different virtual weapons can provide different attack force additions for the controlled virtual object, and different virtual armors can provide different life values and armor additions for the controlled virtual object. In some embodiments, the plurality of first virtual items may also be referred to as a virtual item combination.

The plurality of first virtual items are determined by terminal configuration, or recommended to the terminal by the server, or determined by other modes. The plurality of first virtual items may include virtual items owned by the terminal, and may also include virtual items not owned by the terminal. The plurality of first virtual items form a virtual item combination, any one of the virtual items in the virtual item combination can be changed subsequently, or the current virtual item combination is confirmed to be used, so that the control terminal can conveniently install the plurality of first virtual items in the current virtual item combination on the controlled virtual object to play games.

In some embodiments, the plurality of first virtual items include a virtual item of a target type, where the virtual item of the target type is a virtual item capable of accommodating other virtual items, which are also called sub virtual items, for example. A virtual cartridge clip is a virtual item of a target type. The virtual cartridge clip can accommodate virtual ammunition. A virtual backpack is a virtual item of a target type. Virtual medicine and virtual ammunition that are not equipped in the virtual cartridge clip can be placed in the virtual backpack. In some embodiments, the virtual backpack can also store virtual items that are picked up by the controlled virtual object in the game. For the virtual item of the target type, configuration of the virtual item of the target type not only means configuration of the virtual item, but also means configuration of virtual items accommodated in the virtual item. In some embodiments, the virtual item of the target type is also referred to as a container-type virtual item, and the container-type virtual item is configured to accommodate corresponding sub virtual items.

In some embodiments, in response to a viewing operation on the virtual item display interface, the terminal displays the virtual item display interface, and the virtual item display interface displays a plurality of first virtual items corresponding to different parts of the controlled virtual object.

The above implementation mode is explained below by two examples.

Example 1, a terminal displays a main interface of a game application, and a first function control is displayed on the main interface and configured to view a virtual item display interface. In response to a click operation on the first function control, the terminal displays the virtual item display interface, and a user can view a plurality of configured first virtual items by means of the virtual item display interface. In this case, the click operation on the first function control is also a viewing operation on the virtual item display interface.

The click operation on the first function control may be a click operation performed by a finger of the user on a position corresponding to the first control, or may also be a click operation performed by the user on a position corresponding to the first control by means of an external device. A click operation performed by the user on a position corresponding to the first control is by means of a mouse, as a non-limiting example.

Figure 4:
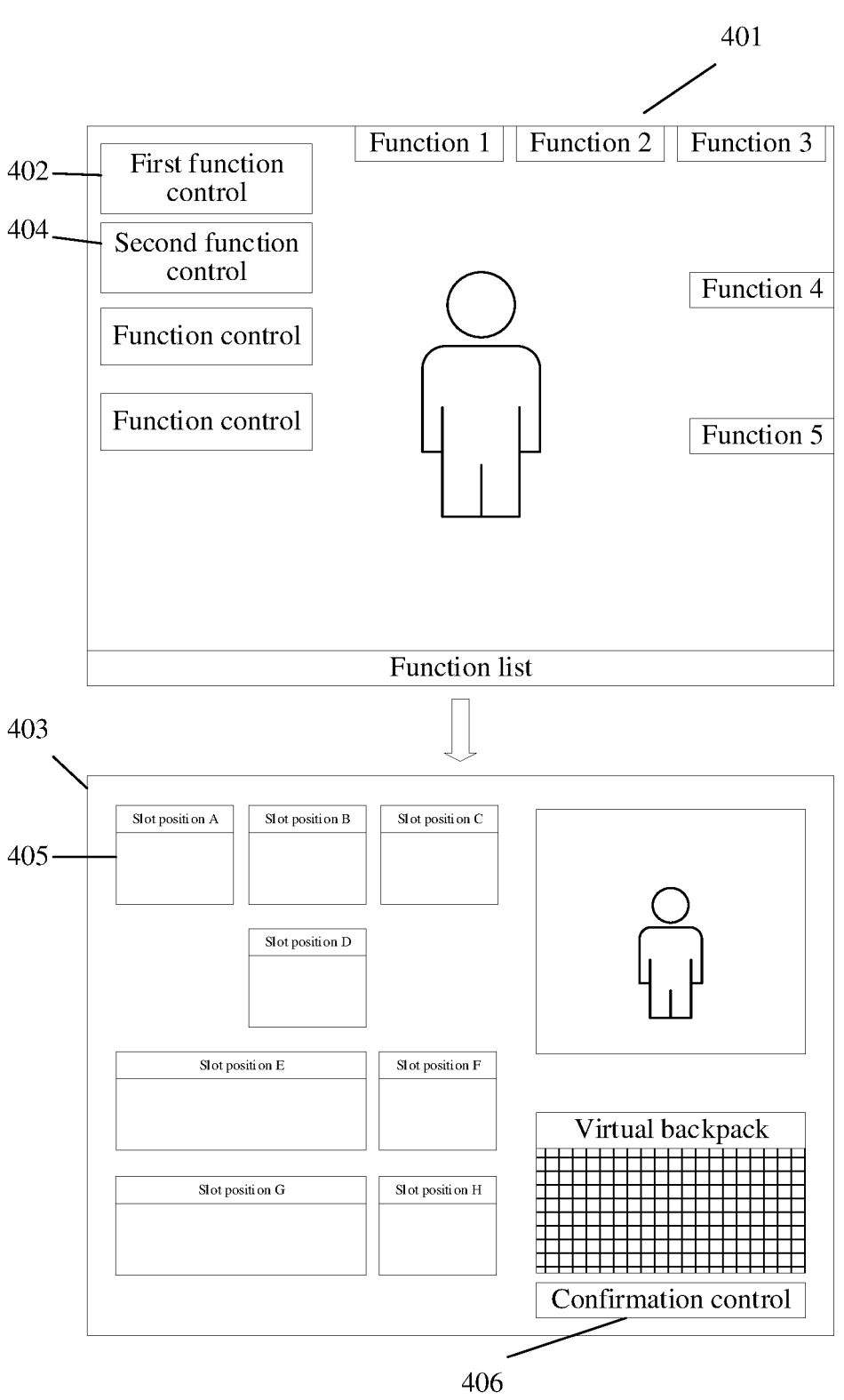
FIG. 4 is a schematic diagram of an interface according to an embodiment of this application.

For example, referring to FIG. 4, after the game application is started, the terminal displays a main interface 401 of the game application, and a first function control 402 is displayed on the main interface 401 of the game application. In response to a click operation on the first function control 402, the terminal displays a virtual item display interface 403, and the virtual item display interface 403 displays a plurality of first virtual items.

As another example, a terminal displays a main interface of a game application, and a second function control is displayed on the main interface, where the second function control is configured to start a competitive battle, such as a shooting game or a fighting game. In response to a click operation on the second function control, the terminal displays a virtual item display interface, and a user can view a plurality of first virtual items by means of the virtual item display interface. When it is confirmed that there is no error with respect to the plurality of first virtual items, the user can control the terminal to replace the virtual items which have been equipped by the controlled virtual object with the plurality of first virtual items to play games. In this case, a click operation on the second function control is a viewing operation on the virtual item display interface.

The click operation on the second function control may be a click operation performed by a finger of the user on a position corresponding to the second control, or may be a click operation performed by the user on a position corresponding to the second control by means of an external device, such as a mouse as a non-limiting example For example, referring to FIG. 4, after a game application is started, the terminal displays the main interface 401 of the game application, and the main interface 401 of the game application displays the second function control 404. In response to the click operation on the second function control 404, the terminal displays the virtual item display interface 403, and the virtual item display interface 403 displays a plurality of first virtual items.

The above-mentioned click operation is used for selecting a control, and may be referred to as a selection operation on the control. In other embodiments, the selection operation may be performed by pressing the control for a long time or by sliding the control, and the like, as non-limiting examples. Click operations described below are similarly implemented.

In some embodiments, the virtual item display interface includes a plurality of slot positions in which the plurality of first virtual items are respectively displayed. In some embodiments, the slot positions are also referred to as equipment positions. The slot positions are also regions for displaying the virtual items. In some embodiments, a slot position has a name of a corresponding type of virtual item displayed thereon. For example, in a shooting game, a slot position has a name "helmet" displayed thereon, which indicates that the slot position is a region for displaying a helmet. In some embodiments, a slot position has an icon of a corresponding type of virtual item displayed thereon. For example, in a shooting game, the icon displayed on a slot position is a helmet, which indicates that the slot position is a region for displaying a helmet.

As described above, the virtual item display interface including the plurality of first virtual items on the terminal is displayed. After the virtual item display interface is displayed, the terminal can adjust the displayed first virtual items in the following manner.

In some embodiments, in response to a trigger operation on any one first virtual item in the plurality of first virtual items, the terminal updates the first virtual item to a virtual item corresponding to the trigger operation. Under the implementation mode, the user can adjust the first virtual items to realize adjustment of the virtual items equipped by the controlled virtual object.

For example, the virtual item display interface includes a plurality of slot positions, and the plurality of first virtual items are respectively displayed in the plurality of slot positions. In response to the click operation of any one slot position in the plurality of slot positions, the terminal displays a virtual item editing interface, and the virtual item editing interface is configured to adjust the first virtual item corresponding to the slot positions. For example, referring to FIG. 4 and FIG. 5, the terminal displays a virtual item display interface 403, the virtual item display interface 403 includes a plurality of slot positions, and the plurality of first virtual items are respectively displayed in the plurality of slot positions. In response to the click operation of any one slot position 405 in the plurality of slot positions, the terminal displays the virtual item editing interface 501.

In some embodiments, the virtual item editing interface includes a virtual item selection list that displays a plurality of candidate virtual items. The plurality of candidate virtual items are virtual items corresponding to the slot positions. In response to any one candidate virtual item in the plurality of candidate virtual items being selected, and the candidate virtual item being a virtual item of a target type, the terminal displays a sub virtual item editing interface in the virtual item editing interface, the sub virtual item editing interface displays a plurality of sub virtual items corresponding to the candidate virtual item, and the virtual item of the target type and the corresponding sub virtual items have a nested relationship. In response to an adjustment operation on any one sub virtual item in the plurality of sub virtual items, the terminal updates the sub virtual items into sub virtual items corresponding to the adjustment operation.

The virtual item of the target type and the corresponding sub virtual items having the nested relationship means that the corresponding sub virtual items belong to the virtual item of the target type. For example, if the virtual item of the target type is a virtual cartridge clip, the corresponding sub virtual items are virtual ammunition. If the virtual item of the target type is a virtual firearm, the corresponding sub virtual items are a virtual sighting telescope, a virtual gunstock, a virtual effector and the like. In some embodiments, a virtual item of a target type can accommodate different types of sub virtual items. For example, taking the virtual item of the target type as a virtual cartridge clip as an example, the user may select different types of virtual ammunition to mix and fill the virtual cartridge clip. That is, different types of virtual ammunition are filled in the same virtual cartridge clip.

For example, in response to any one candidate virtual item in the plurality of candidate virtual items being selected, and the candidate virtual item being a virtual item of a target type, the terminal displays the sub virtual item editing interface in the virtual item editing interface, and the sub virtual item editing interface displays a plurality of sub virtual items corresponding to the candidate virtual item. In response to a click operation on any sub virtual item in the plurality of sub virtual items, the terminal displays a sub virtual item selection list corresponding to the sub virtual items, and the sub virtual item selection list displays a plurality of candidate sub virtual items corresponding to the sub virtual items. In response to a target sub virtual item in the plurality of candidate sub virtual items being selected, the terminal updates the sub virtual items by utilizing the target sub virtual item.

That is, in the above embodiments, if a virtual item of a target type exists in the plurality of first virtual items, or a container-type virtual item exists in the plurality of first virtual items, the user can edit the sub virtual items accommodated in the virtual item of the target type. After editing, the user can install the corresponding sub virtual items, so as to improve the efficiency of human-computer interaction.

In some embodiments, a plurality of sub virtual items that can be accommodated by the virtual item of the target type are set, and the plurality of candidate sub virtual items corresponding to the sub virtual items are: in the plurality of set sub virtual items, the other sub virtual items except the above-mentioned sub virtual items. Namely, the sub virtual item selection list displayed by the terminal includes other sub virtual items except the above-mentioned sub virtual items for the user to select.

The click operation is used for selecting the sub virtual items, which may be referred to as a selection operation on the sub virtual items. In other embodiments, the selection operation on the sub virtual items may be performed with a different operation, such as an operation of pressing the sub virtual items for a long time or an operation of sliding the sub virtual items, as non-limiting examples.

In some embodiments, the virtual item editing interface includes a virtual item selection list that displays a plurality of candidate virtual items. The plurality of candidate virtual items are virtual items corresponding to the slot positions. In response to any one candidate virtual item in the plurality of candidate virtual items being selected, the terminal displays the candidate virtual item in the slot position. That is, the candidate virtual item is used for replacing the first virtual item in the slot position. The plurality of candidate virtual items being virtual items corresponding to the slot positions means that the plurality of candidate virtual items are virtual items corresponding to the type indicated by the slot position. For example, the type indicated by the slot position is a virtual helmet, the first virtual item originally displayed by the slot position is a virtual helmet A, and the user can update the virtual helmet A to a virtual helmet B by clicking the slot position, where the virtual helmet B is also a selected candidate virtual item. The plurality of candidate virtual items are all virtual items corresponding to the type indicated by the slot position, or other virtual items except the virtual items currently displayed on the slot position in the virtual items corresponding to the type indicated by the slot position.

Figure 5:
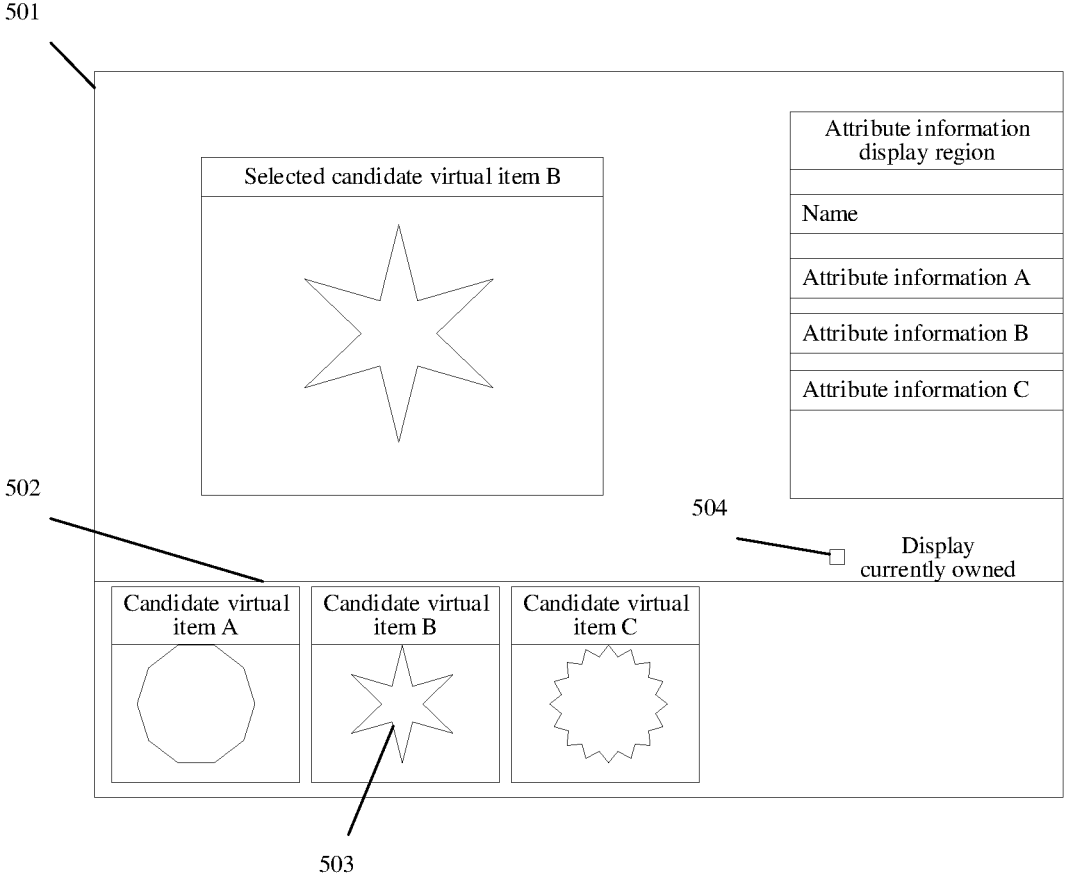
FIG. 5 is a schematic diagram of an interface according to an embodiment of this application.

For example, referring to FIG. 5, the terminal displays a virtual item editing interface 501. The virtual item editing interface 501 includes a virtual item selection list 502, and the virtual item selection list 502 displays a plurality of candidate virtual items. In response to any one candidate virtual item 503 in the plurality of candidate virtual items being selected, the terminal utilizes the candidate virtual item 503 to replace the first virtual item corresponding to the slot position. After the terminal utilizes the candidate virtual item 503 to replace the first virtual item corresponding to the slot position, the candidate virtual item 503 is used as a new first virtual item corresponding to the slot position. When the terminal displays the virtual item display interface next time, the virtual item displayed in the slot position is also a new first virtual item. If the virtual item corresponding to the slot position is a virtual helmet, a virtual helmet A is displayed in the slot position. Correspondingly, the virtual item editing interface 501 is also a virtual item editing interface corresponding to the virtual helmet, and the plurality of candidate virtual items displayed in the virtual item selection list 502 are also a plurality of virtual helmets. In response to any one virtual helmet B in the plurality of virtual helmets being selected, the terminal utilizes the virtual helmet B to replace the virtual helmet A.

In some embodiments, a virtual item screening control is displayed on the virtual item selection list, and the virtual item screening control is used for screening out a candidate virtual item owned by the controlled virtual object from the plurality of candidate virtual items. The virtual item owned by the controlled virtual object described herein includes both a virtual item currently equipped by the controlled virtual object and a virtual item that is already owned but not yet equipped by the controlled virtual object. The virtual item is placed in the virtual warehouse, where the virtual item accommodated in the virtual warehouse cannot be brought into a single game. In addition, the virtual warehouse has a certain capacity, that is, the number of virtual items that can be accommodated by the virtual warehouse is limited. A virtual backpack is a virtual item, and the virtual backpacks are of different types, where different types of virtual backpacks have different capacities. If the controlled virtual object has a plurality of virtual backpacks, the user can install one virtual backpack for the controlled virtual object, and the unequipped virtual backpacks are placed in the virtual warehouse for subsequent use. In some embodiments, the virtual warehouse may also be referred to as a storage box or the like for storing any of the names of virtual items owned by the user. In some embodiments, if the technical solutions provided by this embodiment of this application are not utilized, the user can also select a virtual item for the controlled virtual object from the virtual warehouse. In some embodiments, the plurality of candidate virtual items are also referred to as articles that can be installed to the current position, which is referred to herein as the slot position. In response to the click operation on the virtual item screening control, the terminal screens a plurality of candidate virtual items, and displays the candidate virtual items owned by the controlled virtual object in the virtual item list. That is, before the virtual item screening control is not clicked, all the candidate virtual items corresponding to the slot position are displayed in the virtual item candidate list, and the candidate virtual items include the virtual items owned by the controlled virtual object and the virtual items not owned by the controlled virtual item. For example, if the virtual item corresponding to the slot position is a virtual helmet, and there are three virtual helmets in the game, namely a virtual helmet A, a virtual helmet B and a virtual helmet C, then the virtual helmet A, the virtual helmet B and the virtual helmet C may be displayed simultaneously in the virtual item selection list displayed on the terminal. If the controlled virtual object only has the virtual helmet B, only the virtual helmet B is reserved in the virtual item selection list after the user clicks the virtual item screening control. In this case, the user can screen out the virtual items owned by the controlled virtual object from all the candidate virtual items by clicking the virtual item screening control, so that the virtual items owned by the controlled virtual object in a virtual item combination can be directly utilized when the controlled virtual object is subsequently equipped with the virtual items, purchase and adjustment are not needed, and the efficiency of human-computer interaction is high.

For example, referring to FIG. 5, the terminal displays a virtual item editing interface 501 that includes a virtual item selection list 502. The virtual item selection list 502 displays a plurality of candidate virtual items. In response to a click operation on the virtual item screening control 504, the terminal screens the plurality of candidate virtual items, and displays the candidate virtual items, owned by the controlled virtual object, in the virtual item list.

In some embodiments, the virtual item editing interface includes a virtual item attribute display region. In response to any one candidate virtual item in the plurality of candidate virtual items being selected, the terminal displays attribute information of the candidate virtual items in the virtual item attribute display region. In some embodiments, the attribute information includes a name and an attribute value of the candidate virtual item. If the candidate virtual item is a virtual helmet, then the terminal displays the name of the virtual helmet and the defensive power of the virtual helmet in the virtual item attribute display region. In this case, the user can view the name and the attribute value of the candidate virtual item by means of the virtual item attribute display region, and the user can determine whether the selected candidate virtual item is a virtual item that the user wants to use by means of the name and the attribute value of the virtual item, so that the efficiency of human-computer interaction is high.

In some embodiments, the virtual item display interface includes tags respectively corresponding to a plurality of virtual item combinations. In response to a click operation on any one of the tags, the terminal displays a plurality of first virtual items corresponding to the tag. One virtual item combination corresponds to a plurality of first virtual items. That is, the virtual item display interface may be configured to display a plurality of first virtual items corresponding to the plurality of virtual item combinations. In the above description, when the terminal displays the virtual item display interface, the default display is that the first virtual item combination corresponds to a plurality of first virtual items, and the user can control the terminal to display the plurality of first virtual items corresponding to the virtual item combinations on the virtual item display interface by clicking the tags corresponding to the different virtual item combinations. In the scene of a shooting game, the plurality of virtual item combinations are also a plurality of 'sets' configured in advance by the user. For example, the user can use "virtual machine gun A1+ virtual helmet A2+ virtual mask A3+ virtual body armor A4+ virtual grenade A5" as a virtual item combination, namely a set, and the user can use "virtual sniper gun B1+ virtual helmet B1+ virtual mask B1+ virtual body armor B1+ virtual grenade B1" as another virtual item combination, so that different virtual item combinations can be switched for the controlled virtual object before the game starts, and the efficiency of human-computer interaction is high.

For different virtual item combinations, the user can adjust the plurality of first virtual items corresponding to the different virtual item combinations as previously described.

In the above description, the method for configuring the plurality of first virtual items by means of the virtual item display interface is described below by taking an example that the plurality of first virtual items have been configured on the virtual item display interface.

In some embodiments, the terminal displays the virtual item display interface, and the plurality of first virtual items are configured by means of the virtual item display interface.

For example, in response to a viewing operation on the virtual item display interface, the terminal displays the virtual item display interface, and the virtual item display interface displays a plurality of blank slot positions. In response to a click operation on any one slot position in the plurality of slot positions, the terminal displays the virtual item editing interface corresponding to the slot position. The virtual item editing interface includes a virtual item selection list, the virtual item selection list displays a plurality of candidate virtual items, and the plurality of candidate virtual items are virtual items corresponding to the slot positions. In response to any candidate virtual item in the plurality of candidate virtual items being selected, the terminal displays the candidate virtual item in the slot position, and the candidate virtual item is also the first virtual item corresponding to the slot position.

In some embodiments, the terminal may rank the plurality of candidate virtual items according to the popularity degree of the plurality of candidate virtual items. A candidate virtual item with a higher popularity degree is ranked at the front end of the virtual item selection list, where the popularity degree refers to, as non-limiting examples, the number of times that the corresponding candidate virtual item is used, or the number of times that the corresponding candidate virtual item is configured as a first virtual item, and the like. The terminal can obtain the number of times that the corresponding candidate virtual item is used and the number of times that the corresponding candidate virtual item is configured as the first virtual item from the server. The number of times of using the corresponding candidate virtual item refers to the number of times that a user in a game uses the candidate virtual item within a target duration, where the target duration is set by a technician according to an actual situation. As non-limiting examples, the target duration is set to be one week or one month, and the like. Correspondingly, the number of times that the corresponding candidate virtual item is configured as the first virtual item refers to the number of times that the user in the game configures the candidate virtual item as the first virtual item within the target duration. The plurality of candidate virtual items are ranked on the basis of the popularity degree. In addition, the candidate virtual items with higher popularity degree can be displayed at the front end of the virtual item selection list, so that the user can select the candidate virtual items conveniently.

In some embodiments, the terminal may further be configured to rank the plurality of candidate virtual items according to the winning rates of the plurality of candidate virtual items. A candidate virtual item with a higher winning rate is ranked at the front end of the virtual item selection list, where the winning rate is a frequency of winning when a corresponding candidate virtual item is installed, and the frequency is obtained by dividing the number of winning when the candidate virtual item is used by the number of using the candidate virtual item. The terminal can obtain the winning probability of the corresponding candidate virtual item from the server. The plurality of candidate virtual items are ranked on the basis of the winning rates. The candidate virtual item with a higher winning rate can be displayed at the front end of the virtual item selection list, so that the user can select the candidate virtual item conveniently.

In some embodiments, for a virtual firearm in the plurality of first virtual items, the user can adjust components of the virtual firearm by means of the virtual item display interface, such as a virtual sighting telescope, a virtual hand rest, and a virtual silencer of the virtual firearm, which may also be referred to as "firearm modification".

In some embodiments, the user may also configure a rendering mode for the plurality of first virtual items by means of the virtual item display interface, that is, adjust textures and parameters used when the terminal renders the plurality of first virtual items, and in some embodiments, this process is also referred to as "costume change".

After the plurality of first virtual items are configured by means of the virtual item display interface, the plurality of configured first virtual items can be used repeatedly in subsequent games, and therefore the efficiency of selecting the virtual items for the controlled virtual object by the user is improved.

In some embodiments, before step 301, the terminal can further display the virtual item configuration interface, and the virtual item configuration interface is used for configuring the plurality of first virtual items. In response to a confirmation operation on the virtual item configuration interface, the terminal displays the virtual item display interface. In some embodiments, the virtual item configuration interface is a virtual item display interface in which virtual items have not been configured. The virtual item configuration interface includes a plurality of slot positions that are blank slot positions. In some embodiments, the slot positions are also referred to as equipment positions. The slot positions are also regions used for configuring the virtual items. In some embodiments, a slot position has a name of a corresponding type of virtual item displayed thereon. For example, in a shooting game, a slot position has a name "helmet" displayed thereon, which indicates that the slot position is a region for displaying a helmet. In some embodiments, a slot position has an icon of a corresponding type of virtual item displayed thereon. For example, in a shooting game, the icon displayed on a slot position is a helmet, which indicates that the slot position is a region for displaying a helmet. A user can configure a plurality of first virtual items by clicking unused slot positions. In some embodiments, a saving control is displayed in the virtual item configuration interface, and in response to a click operation on the saving control, the terminal displays the virtual item display interface.

That is, before the game starts, the user can configure a plurality of first virtual items by means of the virtual item configuration interface. In the subsequent game process, the equipment of the controlled virtual object can be updated on the basis of the plurality of first virtual items configured by the user, so that the autonomy of the user is high, and the efficiency of human-computer interaction is also high.

302: Compare, by the terminal, the plurality of first virtual items with second virtual items owned by the controlled virtual object in response to a confirmation operation on the virtual item display interface.

The second virtual items owned by the controlled virtual object include virtual items currently equipped by the controlled virtual object and virtual items in the virtual warehouse of the controlled virtual object. In some embodiments, the virtual items currently owned by the controlled virtual object include virtual backpacks, and the virtual backpacks carry virtual items such as virtual medicine or virtual ammunition. In some embodiments, virtual items currently equipped or held by the controlled virtual object belong to virtual items in a virtual backpack. Thus, the equipped virtual items refer to virtual items in the backpack, and the second virtual items owned by the controlled virtual object include the virtual items in the virtual backpack and the virtual items in the virtual warehouse of the controlled virtual object. In some embodiments, the virtual items equipped or held by the controlled virtual object do not belong to the virtual backpack. In such embodiments, the virtual items equipped or held by the controlled virtual object and the virtual items in the virtual backpack are the virtual items which have been equipped by the controlled virtual object.

In some embodiments, when the terminal compares the plurality of first virtual items with the second virtual items, the terminal compares the identifiers of the plurality of first virtual items with the identifiers of the second virtual items. The identifier of one first virtual item being the same as the identifier of one second virtual item indicates that the first virtual item and the second virtual item are the same virtual item, and the controlled virtual object also owns the first virtual item. The identifier of one first virtual item being different from the identifier of each second virtual item indicates that the controlled virtual object does not own the first virtual item.

In some embodiments, a confirmation control is displayed on the virtual item display interface. In response to a click operation on the confirmation control, the terminal compares the plurality of first virtual items with the second virtual items, where the click operation on the confirmation control is a confirmation operation on the virtual item display interface. Because the first virtual items are virtual items configured in advance, the second virtual items are virtual items owned by the controlled virtual object, and the process of the terminal comparing the plurality of first virtual items with the second virtual items is the process of comparing the virtual items configured ahead of time with the virtual items owned by the controlled virtual object. The comparison result can indicate which first virtual items are owned by the controlled virtual object and which first virtual items are lacked by the controlled virtual object.

For example, referring to FIG. 4, a confirmation control 406 is displayed on the virtual item display interface 403. In response to a click operation on the confirmation control 406, the terminal compares the identifiers of the plurality of first virtual items with the identifiers of the second virtual items.

In some embodiments, in response to a target gesture on the virtual item display interface, the terminal compares the plurality of first virtual items with the plurality of second virtual items. The target gesture on the virtual item display interface is also a confirmation operation on the virtual item display interface, where the target gesture is set by a technician according to an actual situation. As non-limiting examples, the target gesture is a continuous click operation on the virtual item display interface, a swipe operation on the virtual item display interface, or a combination operation of two fingers on the virtual item display interface, and the like.

In some embodiments, the terminal may store the comparison result in a list manner. That is, in response to any of the first virtual items being the same as any of the second virtual items, the terminal adds the identifiers of the first virtual items to a first list, where the first list is used for storing the identifiers, which are queried in the second virtual items, of the first virtual items. In response to any of the first virtual items being different from any of the second virtual items, the terminal adds the identifiers of the first virtual items to a second list, and the second list is used for storing the identifiers, which are not queried in the second virtual items, of the first virtual items. In this way, if the controlled virtual object has a certain first virtual item, the terminal can add the identifier of the first virtual item to the first list to indicate that the first virtual item is the virtual item owned by the controlled virtual object. If the controlled virtual object does not have a certain first virtual item, the terminal can add the identifier of the first virtual item to the second list to indicate that the second virtual item is a virtual item which is not owned by the controlled virtual object. In some embodiments, the first list is also referred to as a Found List, and the second list is also referred to as a Lack List. The comparison result is stored in a list manner, and the subsequent processing efficiency of the terminal is improved.

In some embodiments, the plurality of first virtual items include a virtual item of a target type. That is, a certain first virtual item is configured to accommodate other virtual items. In this case, the terminal can further store the comparison result as follows. In response to any of the first virtual items being the same as any of the second virtual items, the terminal adds the identifiers of the first virtual items to the first list, and the first list is used for storing the identifiers, which are queried in the second virtual items, of the first virtual items. In response to the second virtual item being the virtual item of the target type, the identifiers of the sub virtual items accommodated by the second virtual item to a third list, where the third list is used for storing the sub virtual items accommodated by the virtual item of the target type in the plurality of first virtual items. In some embodiments, the third list is also referred to as an Extern List. In response to any of the first virtual items is different from the second virtual items, the terminal adds the identifiers of the first virtual items to the second list, and the second list is used for storing the identifiers, which are not queried in the second virtual items, of the first virtual items. In response to the second list and the third list having the same identifiers of the virtual items, the identifiers of the virtual items are added to the first list, and the identifiers of the virtual items are deleted from the second list and the third list. Under this implementation, after the plurality of first virtual items and the plurality of second virtual items are compared, other virtual items of the virtual item of the target type may not be searched, and only the second list and the third list are merged once after the comparison is completed, so that whether the second virtual item contains sub virtual items accommodated by the virtual item of the target type can be determined, and the efficiency is high.

In the above step 302, the terminal compares the plurality of first virtual items with the second virtual items as an example implementation. In other implementations, the server may also compare the plurality of first virtual items with the second virtual items. That is, in response to the confirmation operation on the virtual item display interface, the terminal sends a comparison request to the server, where the comparison request carries the identifiers of the plurality of first virtual items. After the server receives the comparison request, the identifiers of the first virtual items are obtained from the comparison request. The comparison is carried out on the identifiers of the plurality of first virtual items and the second virtual items, and the comparison result is sent to the terminal, so that the calculation amount of the terminal can be reduced, and the phenomena of terminal heating and jamming are reduced.

In some embodiments, after step 302, the terminal can perform steps 303, 304 and 305.

303: Display, by the terminal, a virtual item transaction interface in response to the first virtual items not being in the second virtual items, the virtual item transaction interface being configured to obtain the first virtual items.

In some embodiments, in response to the identifier of any of the first virtual items being in the second list, the terminal displays the virtual item transaction interface, where the second list is used for storing the identifiers, which are not queried in the second virtual items, of the first virtual items. If the identifier of any of the first virtual items being in the second list indicates that the first virtual items do not exist in the second virtual items, the terminal displays the virtual item transaction interface, and the user can obtain the first virtual items by means of the virtual item transaction interface. Of course, if two or more first virtual items are not in the second virtual items, the virtual item transaction interface displayed by the terminal is also configured to obtain the two or more first virtual items.

Figure 6:
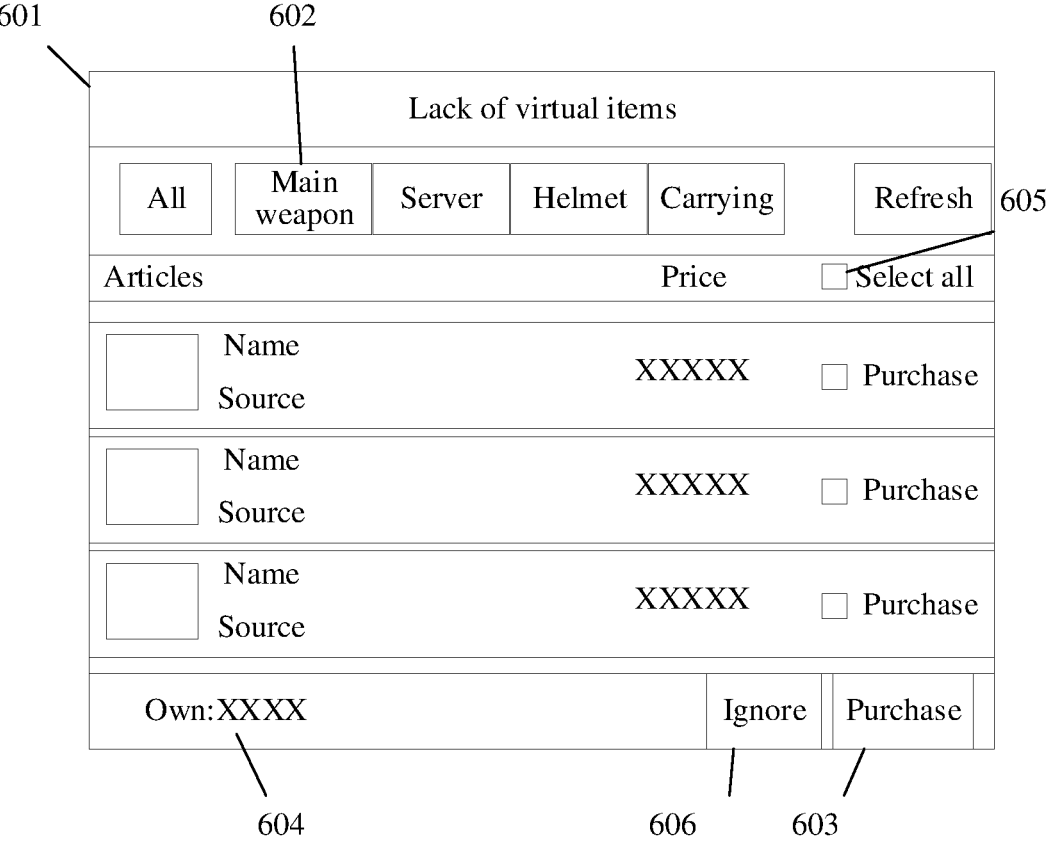
FIG. 6 is a schematic diagram of an interface according to an embodiment of this application.

For example, referring to FIG. 4 and FIG. 6, in response to a click operation on a confirmation control 405, any of the first virtual items are not in the second virtual items, and then the terminal displays the virtual item transaction interface 601.

In some embodiments, at least one piece of item information for the first virtual item is displayed in the virtual item transaction interface, and the item information includes the name of the first virtual item, and the type and amount of virtual resources required to purchase the first virtual item. In some embodiments, at least one piece of item information displayed in the virtual item transaction interface is item information issued by other accounts. The other accounts are accounts other than the account corresponding to the controlled virtual object. In other words, the at least one piece of item information is item information issued by other players, and is used for selling the corresponding first virtual item. The user can know the price of selling the first virtual item by different players by viewing the at least one piece of item information, so that the user can conveniently screen the item information. In some embodiments, non-limiting examples of types of the virtual resources include a "coupon" obtained by charging by a user, a "game currency" obtained by playing a game, an "activity-specific currency" obtained by participating in an activity in the game, and the like. If two or more first virtual items are not in the second virtual items, the tags corresponding to the two or more first virtual items are displayed in the virtual item transaction interface. In some embodiments, the tab is also referred to as a "paginated tag," and the user can view item information for each type of first virtual items individually by clicking the paginated tag. In response to a click operation on any tag, the terminal displays at least one piece of item information corresponding to the first virtual items in the virtual item transaction interface. Referring to FIG. 6, if two or more first virtual items exist but are not in the second virtual items, paginated tags 602 corresponding to the two or more first virtual items are displayed in the virtual item transaction interface.

In some embodiments, the at least one piece of item information is item information determined based on recommendation priority, and the recommendation priority includes at least one of the type priority of the virtual resources, the quantity priority of the virtual resources, and the type priority of the virtual items.

The type priority of the virtual resources refers to a sequence of types of virtual resources consumed when a virtual item is purchased. For example, three virtual resources including a virtual resource A, a virtual resource B and a virtual resource C exist. When the virtual item is purchased, the sequence of consumption of the three virtual resources is the virtual resource B→the virtual resource A→the virtual resource C, then when the terminal displays at least one piece of item information by means of the virtual item transaction interface. The item information needing to consume the virtual resource B is preferentially displayed. By preferentially displaying the item information, the item information needing to consume the virtual resource B is ranked first. The number priority of the virtual resources refers to when a virtual item is purchased, virtual resources with a large quantity in an account are consumed preferentially. For example, when three virtual resources including a virtual resource A, a virtual resource B and a virtual resource C exist, the three virtual resources are ranked by number from most to least as the virtual resource B→the virtual resource A→the virtual resource C. When the terminal displays at least one piece of item information by means of the virtual item transaction interface, the item information needing to be consumed by the virtual resource B is displayed preferentially. By preferentially displaying the item information, the item information needing to be consumed by the virtual resource B is ranked first. The type priority of the virtual items refers to the purchase sequence of the plurality of virtual items when the plurality of virtual items are purchased simultaneously. For example, three virtual items, namely a virtual item A, a virtual item B and a virtual item C, need to be purchased simultaneously. When the virtual items are purchased, the purchase priority of the three virtual items is the virtual item B> the virtual item A> the virtual item C. When the terminal displays at least one piece of item information by means of the virtual item transaction interface, the item information of the virtual item B is displayed preferentially. By preferentially displaying the item information, the item information of the virtual item B is ranked first. In some embodiments, the type priority of the virtual items also has an expression or priority. For example, suppose that two virtual items, namely, a virtual item A and a virtual item B, are to be purchased simultaneously, and the number of virtual resources owned by the current account is only enough to purchase one of the virtual item A or the virtual item B. If the type priority of the virtual item A is greater than the type priority of the virtual item B, the terminal only displays the item information of the virtual item A in the virtual item transaction interface.

In some embodiments, the virtual item transaction interface includes a refresh control. In response to a click operation on the refresh control, the terminal refreshes at least one piece of item information displayed in the virtual item transaction interface. That is, in response to the click operation on the refresh control, the terminal sends a refresh request to the server, where the refresh request carries the identifier of the first virtual item. After receiving the refresh request, the server acquires the identifier of the first virtual item from the refresh request. The server queries based on the identifier of the first virtual items, acquires at least one piece of item information corresponding to the first virtual item, and sends the at least one piece of item information to the terminal. In turn, the terminal displays the at least one piece of item information in the virtual item transaction interface.

In some embodiments, if no item information corresponding to the first virtual item exists, the terminal displays a target mark in the virtual item transaction interface, where the target mark is used for indicating that no item information corresponding to the first virtual item exists. That is, no other account is selling the first virtual item, and in this case, the user needs to adjust the first virtual item.

In some embodiments, in response to a purchase operation based on any piece of item information, the terminal adds the first virtual item corresponding to the item information to the virtual warehouse of the controlled virtual object.

For example, in response to a purchase operation based on any piece of item information, the terminal compares a first virtual resource quantity with a second virtual resource quantity, where the first virtual resource quantity is the quantity of virtual resources indicated by the item information, and the second virtual resource quantity is the quantity of virtual resources owned by an account corresponding to the controlled virtual object. In response to the second virtual resource quantity being greater than or equal to the first virtual resource quantity, the terminal adds the first virtual item corresponding to the item information to the virtual warehouse of the controlled virtual object. In some embodiments, the purchase operation based on any piece of item information includes a selection operation on the item information and a click operation on a transaction control. Referring to FIG. 6, options corresponding to the piece of item information are displayed behind each piece of item information, and in response to a click operation on any piece of item information, the option corresponding to the piece of item information is selected. In response to the click operation on the transaction control 603, the terminal completes the purchase operation based on the piece of item information. In some embodiments, in response to the second virtual resource quantity being greater than or equal to the first virtual resource quantity, the terminal can directly install the first virtual item corresponding to the item information to the controlled virtual object, in addition to adding the first virtual item corresponding to the item information to the virtual warehouse of the controlled virtual object. In some embodiments, while the terminal adds the first virtual item corresponding to the item information to the virtual warehouse of the controlled virtual object, the terminal deducts the first virtual resource quantity from the second virtual resource quantity owned by the account, and transfers the virtual resources of the first virtual resource quantity to the account corresponding to the item information.

In addition, if multiple types of virtual resources exist, in response to the click operation on any piece of item information, the terminal compares the first virtual resource quantity with the second virtual resource quantity, where the first virtual resource quantity is the quantity of the virtual resources of the target type indicated by the item information, and the second virtual resource quantity is the quantity of the virtual resources of the target type owned by the account corresponding to the controlled virtual object. In response to the fact that the second virtual resource quantity is greater than or equal to the first virtual resource quantity, the terminal adds the first virtual item corresponding to the item information to the virtual warehouse of the controlled virtual object. In some embodiments, in response to the second virtual resource quantity being greater than or equal to the first virtual resource quantity, the terminal can directly install the first virtual item corresponding to the item information to the controlled virtual object, in addition to adding the first virtual item corresponding to the item information to the virtual warehouse of the controlled virtual object. In some embodiments, while the terminal adds the first virtual item corresponding to the item information to the virtual warehouse of the controlled virtual object, the terminal deducts the first virtual resource quantity from the second virtual resource quantity owned by the account, and transfers the virtual resources of the first virtual resource quantity to the account corresponding to the item information.

In some embodiments, the type and number of the virtual resources owned by the current account are displayed in the virtual item transaction interface, and the user can know the type and the number of the virtual resources owned by the account by means of the virtual item transaction interface, so that the efficiency of human-computer interaction is high. Referring to FIG. 6, the terminal displays the type and number 604 of virtual resources owned by the current account in the virtual item transaction interface 601.

In some embodiments, the virtual item transaction interface includes a select-all control, and in response to a click operation on the select-all control, the terminal selects all of at least one piece of item information displayed in the virtual item transaction interface. In response to the click operation on the transaction control 603, the terminal adds a first virtual item corresponding to the at least one piece of selected item information to the virtual warehouse of the controlled virtual object. Referring to FIG. 6, the virtual item transaction interface 601 includes a select-all control 605. That is, in this embodiment of this application, the user can purchase only a first virtual item corresponding to a certain piece of item information, and can also directly purchase a first virtual item corresponding to all item information.

In some embodiments, in response to a purchase operation based on any piece of item information, where the space occupied by the first virtual item corresponding to the item information is larger than the remaining space of the virtual warehouse of the controlled virtual object, the terminal adds the first virtual item corresponding to the item information to the temporary pack of the controlled virtual object.

The temporary pack is a temporary virtual pack which appears when the virtual warehouse of the controlled virtual object cannot accommodate the purchased first virtual items. In some embodiments, the virtual items in the temporary pack need to be manually taken out by the user. That is, after the user manually adjusts the virtual items in the virtual warehouse, the virtual items in the temporary pack are dragged to the virtual warehouse. In some embodiments, when the virtual items exist in the temporary pack, the terminal cannot switch back to the virtual item display interface from the virtual item transaction interface. That is, the user needs to process the virtual items in the temporary pack in the virtual item transaction interface.

Figure 7:
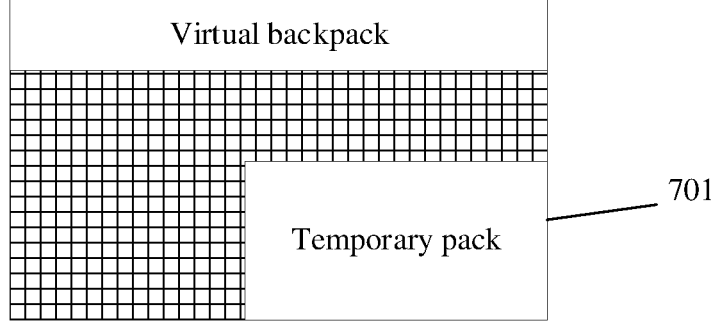
FIG. 7 is a schematic diagram of an interface according to an embodiment of this application.

For example, referring to FIG. 7, in response to a purchase operation based on any piece of item information, and the space occupied by the first virtual item corresponding to the item information being larger than the remaining space of the virtual warehouse of the controlled virtual object, the terminal adds the first virtual item corresponding to the item information to the temporary pack 701 of the controlled virtual object.

304: Update, by the terminal, the virtual items that have been equipped by the controlled virtual object by utilizing the first virtual item owned by the controlled virtual object in response to a closing operation on the virtual item transaction interface.

In some embodiments, the virtual item transaction interface includes an interface closing control. In response to a click operation on the interface closing control, the terminal updates the virtual item that has been equipped by the controlled virtual object by using the first virtual item owned by the controlled virtual object. That is, after the terminal displays the virtual item transaction interface, if the user does not want to purchase the virtual item by means of the virtual item transaction interface, the virtual item transaction interface can be directly closed. In this case, the terminal directly uses the first virtual item owned by the controlled virtual object to update the virtual item that has been equipped by the controlled virtual object, and the terminal ignores the first virtual item that is not owned by the controlled virtual object. In some embodiments, for the first virtual item that is ignored by the terminal, the terminal can install the same type of virtual item in the virtual warehouse of the controlled virtual object to the controlled virtual object, or, if the controlled virtual object has already been equipped with a virtual item of the same type as the first virtual item, the terminal does not update the virtual item that the controlled virtual object is equipped with. For example, referring to FIG. 6, the virtual item transaction interface 601 includes an interface closing control 606. In response to a click operation on the interface closing control 606, the terminal determines a plurality of corresponding second virtual items by using identifiers of a plurality of second virtual items stored in the first list, where the plurality of second virtual items are all first virtual items owned by the controlled virtual object. The terminal updates the virtual items that have been equipped by the controlled virtual object by utilizing the plurality of second virtual items. When the terminal updates the virtual items that have been equipped by the controlled virtual object by utilizing the plurality of second virtual items, any one of the following may be implemented.

In a first implementation, the terminal adds all of the virtual items that have been equipped by the controlled virtual object to the virtual warehouse of the controlled virtual object, and determines the plurality of second virtual items as the virtual items equipped by the controlled virtual object. That is, the terminal installs the plurality of second virtual items to the controlled virtual object. If a first virtual item that is not owned by the controlled virtual object exists, the terminal queries a virtual item of the same type as the first virtual item in the virtual warehouse of the controlled virtual object, and determines the virtual item as a virtual item equipped by the controlled virtual object. For example, if the controlled virtual object does not have the virtual helmet A, the terminal can determine the virtual helmet B in the virtual warehouse of the controlled virtual object as a virtual item equipped by the controlled virtual object. Or, if the controlled virtual object has been equipped with the virtual item of the same type as the first virtual item, the terminal does not update the virtual item. For example, if the controlled virtual object does not have the virtual helmet A, but the controlled virtual object has already been equipped with the virtual helmet B, the terminal does not update the virtual helmet B.

In a second implementation, the terminal adds a third virtual item which has been equipped by the controlled virtual object to the virtual warehouse of the controlled virtual object, where the third virtual item is a virtual item different from the corresponding first virtual item. The terminal determines the virtual items that are not installed in the plurality of second virtual items as the virtual items that are installed in the controlled virtual object. Namely, if the controlled virtual object has been equipped with any one virtual item of the plurality of first virtual items, the terminal cannot remove the virtual items but can reserve the virtual items, so that the calculation amount of the terminal can be reduced, and the efficiency of equipment updating of the controlled virtual object is improved. If a first virtual item that is not owned by the controlled virtual object exists, the terminal queries a virtual item of the same type as the first virtual item in the virtual warehouse of the controlled virtual object, and determines the virtual item as a virtual item equipped by the controlled virtual object. For example, if the controlled virtual object does not have the virtual helmet A, the terminal can determine the virtual helmet B in the virtual warehouse of the controlled virtual object as a virtual item equipped by the controlled virtual object. Or, if the controlled virtual object has been equipped with the virtual item of the same type as the first virtual item, the terminal does not update the virtual item. For example, if the controlled virtual object does not have the virtual helmet A, but the controlled virtual object has already been equipped with the virtual helmet B, the terminal does not update the virtual helmet B.

305: Update, by the terminal, the virtual items equipped by the controlled virtual object into the plurality of first virtual items in response to the fact that the plurality of first virtual items are second virtual items owned by the controlled virtual object.

In some embodiments, in response to that the plurality of first virtual items are all second virtual items owned by the controlled virtual object, the terminal adds third virtual items that have been equipped by the controlled virtual object to the virtual warehouse of the controlled virtual object, where the third virtual items are virtual items different from the corresponding first virtual items. The terminal determines the plurality of first virtual items in the virtual warehouse as the virtual items equipped by the controlled virtual object.

In some embodiments, if the controlled virtual object has at least two identical first virtual items, the terminal can screen the at least two identical first virtual items on the basis of the durability of the virtual items, and determine a target virtual item from the at least two identical first virtual items to update the virtual item that has been equipped by the controlled virtual object, where the durability of the virtual item is used for indicating the wear degree of the virtual items. When the controlled virtual object uses the virtual items in a virtual scene, the virtual items may be worn to different degrees, and the durability may indicate the wear degree. In some embodiments, the initial durability of the virtual items is 100, and as the controlled virtual object is used, the durability of the virtual items gradually changes to 90, 80, 70, and 60, and the like. The durability of the virtual items changing to 0 indicates that the wear degree of the virtual items is high, and the user needs to repair the virtual items before continuing to use the virtual items. In some embodiments, repairing the virtual items requires consuming a certain amount of virtual resources. In some embodiments, the terminal may determine, as the target virtual item, a first virtual item with a higher durability among the at least two identical first virtual items, or determine, as the target virtual item, a first virtual item with a lower durability among the at least two identical first virtual items, as non-limiting examples.

In some embodiments, in response to the identifier of any of the first virtual items not existing in the second list, the terminal determines the plurality of first virtual items owned by the controlled virtual object on the basis of the identifiers of the plurality of first virtual items stored in the first list. The terminal updates the virtual items that have been equipped by the controlled virtual object into the plurality of first virtual items.

In some embodiments, the terminal utilizes a "colored tree" method when updating the virtual items that have been equipped by the controlled virtual object. That is, a plurality of first virtual items are regarded as a tree, and the controlled virtual object is used as a root node. Item nodes are divided into three colors: white, black and red, where white indicates that the node has found the corresponding virtual item, black indicates that the node has not found the corresponding virtual item, and red indicates that the node has found the corresponding virtual item. However, due to the deletion of the virtual item of a father node, the virtual item is to be used as a node put back to the virtual warehouse, and the virtual item of the father node is also a container virtual item of the virtual item. The terminal traverses all the nodes from the root node in sequence and colors the nodes. In the initial state, all nodes in the tree are preset to be colorless. When any node is processed, an attempt is made to obtain a virtual item from the first list. If the corresponding virtual item is found, the node is colored into white, and item attribute information is recorded at the node, where the item attribute information includes information such as the name, the attribute and the storage position of the virtual item. If the corresponding virtual item is not found, the node is colored into black, and all direct sub nodes are colored into red. Three colors have priority, black> red> white in order from high to low. Only low priority colors can be recolored to high priority colors. That is, a node that has been colored into white may be colored into red again, and not vice versa. Since the coloring is done from the root to the top of the tree, the sub nodes of the nodes may be colored into red as the nodes are processed. When the sub nodes are processed, if the virtual item is found, the sub nodes are still red according to the priority during coloring; and if the virtual item is not found, the sub nodes are recolored to black.

After the coloring of the whole tree is completed, a parent-child relationship can be reconstructed according to the color of the tree. All the virtual items at the white nodes can directly establish a parent-child relationship with the virtual item of the father node; and the black nodes have no virtual items found, so that no parent-child relationship is constructed. Although the red nodes have the found virtual items, due to the loss of the father node of the red nodes, the red nodes and the sub nodes thereof can be put back to the virtual pack after the father-child relationship is constructed, and the red nodes are the root nodes of the virtual items put back to the virtual pack. After the parent-child relationship is constructed, all the item attribute information is submitted to the server as a solution and synchronization is requested.

In some embodiments, after step 305, the terminal updates the model of the controlled virtual object by using the models of the plurality of first virtual items. The model of the controlled virtual object is the image of the controlled virtual object in the virtual scene and the image of the controlled virtual object in the main interface. When the terminal updates the model of the controlled virtual object, the models of the plurality of first virtual items are utilized to replace the models of the corresponding parts in the controlled virtual object. The terminal renders the models of the first virtual items on the basis of rendering parameters corresponding to the models of the plurality of first virtual items respectively to obtain the updated model of the controlled virtual object. As a non-limiting example, the rendering parameters corresponding to the models are set by technicians according to an actual situation. In some embodiments, different rendering parameters may correspond to different rendering effects for the same first virtual item, and the different rendering effects may be referred to as different "skins". For example, if the controlled virtual object has already been equipped with a virtual firearm A, the model of the virtual firearm A is also included in the model before the model is updated. If the virtual firearm in the plurality of first virtual items is a virtual firearm B, the terminal utilizes the model of the virtual firearm B to replace the model of the virtual firearm A in the model of the controlled virtual object, the model of the virtual firearm B is rendered based on the rendering parameters corresponding to the model of the virtual firearm B, and in the updated model of the controlled virtual object, the virtual firearm held by the controlled virtual object is changed from the virtual firearm A to the virtual firearm B. That is, in this embodiment, after the virtual item that has been equipped by the controlled virtual object is updated, the terminal can update the image of the controlled virtual object synchronously to achieve the more real display effect to the controlled virtual object. Additionally, the user can learn, by change of the image of the controlled virtual object, that the virtual item that is equipped by the controlled virtual object is changed, and the efficiency of human-computer interaction is higher. In some embodiments, the model of the controlled virtual object is also referred to as the image of the controlled virtual object.

In some embodiments, the plurality of first virtual items include the virtual item of the target type. In response to the plurality of first virtual items being the second virtual items owned by the controlled virtual object, and the controlled virtual object having been equipped with the virtual item of the target type, the terminal compares the plurality of first sub virtual items with a plurality of second sub virtual items. The first sub virtual items are sub virtual items corresponding to the virtual item of the target type in the first virtual items, and the second sub virtual items are sub virtual items corresponding to the virtual item of the target type, which has been equipped by the controlled virtual object. Additionally, the virtual item of the target type and the corresponding sub virtual items have a nested relationship. If the plurality of second sub virtual items are the same as the plurality of first sub virtual items, the terminal does not update the sub virtual items accommodated by the virtual item of the target type. If second sub virtual items different from the corresponding first sub virtual items exist in the plurality of second sub virtual items, the terminal utilizes the corresponding first sub virtual items to update the second sub virtual items.

That is, if the virtual items are ranked, the first virtual items and the second virtual items may be classified into a first level, and the virtual item of the target type may be classified into a second level. If the plurality of first virtual items are second items owned by the controlled virtual object, the configured first-level virtual items are first-level virtual items owned by the controlled virtual object. If the plurality of first virtual items include the virtual item of the target type, namely the second-level virtual items, and the controlled virtual object has been equipped with the virtual item of the target type, the terminal can further compare the sub virtual items corresponding to the virtual item of the target type. That is, the terminal compares the second-level virtual items. If the controlled virtual object is equipped with the virtual item of the target type, and the second-level virtual items accommodated in the equipped virtual item of the target type are completely the same as the second-level virtual items accommodated in the configured virtual item of the target type (that is, the sub virtual items are completely the same), then the terminal does not need to update the virtual item of the target type. If the controlled virtual object is equipped with the virtual item of the target type, and a second-level virtual item different from the second-level virtual items accommodated in the configured virtual item of the target type exists in the second-level virtual items accommodated in the equipped virtual item of the target type, the terminal only needs to update the second-level virtual item.

For example, if the configured virtual item of the target type is a virtual firearm, the virtual firearm corresponds to three sub virtual items, namely, a virtual sighting telescope A1, a virtual gunstock A2 and a virtual silencer A3. If the controlled virtual object is also equipped with the virtual firearm, and the three sub virtual items corresponding to the virtual firearm are also the virtual sighting telescope A1, the virtual gunstock A2 and the virtual silencer A3, the terminal does not need to update the sub virtual items corresponding to the virtual firearm. If the controlled virtual object is equipped with the virtual firearm, the three sub virtual items corresponding to the virtual firearm are the virtual sighting telescope A1, the virtual gunstock B1, and the virtual silencer A3. In this case, the terminal only needs to update virtual gunstock B1 to a virtual gunstock A2, and does not need to update other sub virtual items.

Other embodiments formed by using any combination of the foregoing technical solutions are possible.

In order to more clearly describe the technical solutions provided in this embodiment of this application, the technical solutions provided in this embodiment of this application will be more clearly described below with reference to the above steps 301-305 as well as FIG. 8 and FIG. 9.

Figure 8:
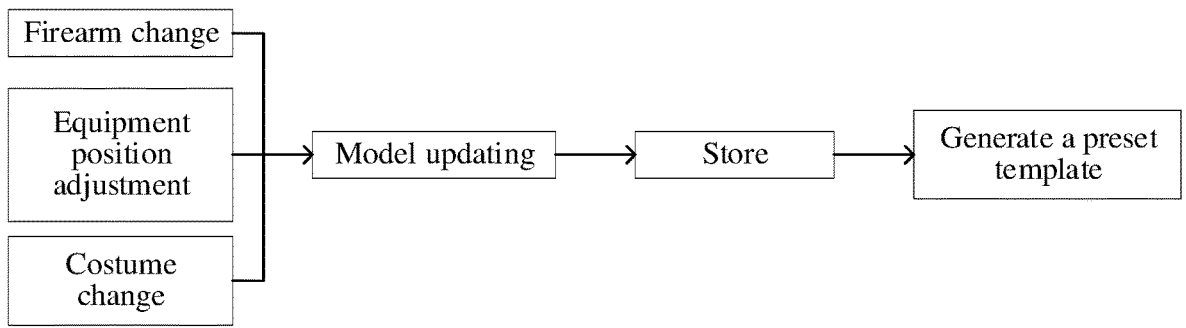
FIG. 8 is a schematic diagram of a method for configuring a plurality of first virtual items according to an embodiment of this application.

FIG. 8 is a schematic diagram of a method for configuring a plurality of first virtual items. Referring to FIG. 8, when the plurality of first virtual items are configured, three discrete processes are implemented, including: firearm modification, equipment position adjustment, and costume change, where the firearm modification refers to adjustment of components on the virtual firearm in the plurality of first virtual items. Equipment positions are the slot positions, and the equipment position adjustment represents adjustment of the first virtual items corresponding to the slot positions. The costume change refers to adjusting the rendering manner of the first virtual items. After the three discrete processes are completed, the terminal can update the model of the controlled virtual object, store the results of the three discrete processes, and generate a preset template, where the preset template only includes the plurality of first virtual items.

Figure 9:
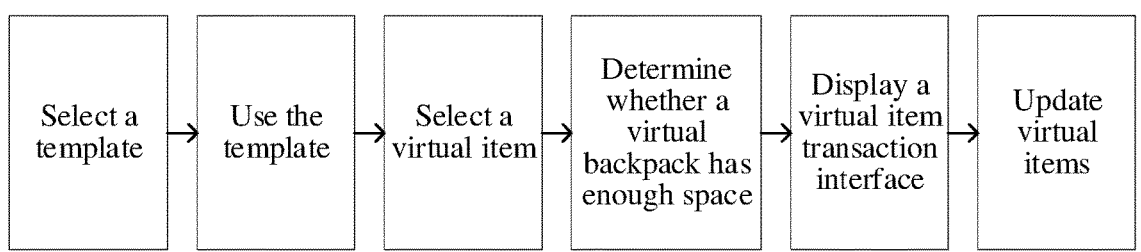
FIG. 9 is a schematic diagram of a method for updating virtual items which have been equipped by a controlled virtual object according to an embodiment of this application.

FIG. 9 is a schematic diagram of a method for updating a virtual item that has been equipped by the controlled virtual object. Referring to FIG. 9, the user can select the plurality of first virtual items to be used by means of the virtual item display interface, where the plurality of first virtual items are also a template. The terminal determines whether the controlled virtual object has the plurality of first virtual items, and determines a plurality of virtual items to be used from second virtual items owned by the controlled virtual object. The process is also called using a template. When the controlled virtual object has two or more identical first virtual items, the terminal selects the two or more identical first virtual items. The terminal determines whether the space of the virtual warehouse of the controlled virtual object has sufficient space. When the terminal determines that the controlled virtual object does not have any of the first virtual items, the virtual item transaction interface is displayed, and the first virtual item is obtained by means of the virtual item transaction interface. After the first virtual item is obtained, a plurality of first virtual items are utilized to update the virtual items which have been equipped by the controlled virtual object.

By means of the solution provided by this embodiment of this application, virtual items do not need to be selected for the controlled virtual object one by one, and the virtual items are directly selected in batches for the controlled virtual object on the basis of the virtual item display interface. When the controlled virtual object does not have a certain virtual item displayed in the virtual item display interface, a virtual item transaction interface is directly displayed, and the corresponding virtual items are quickly obtained by means of the virtual item transaction interface. Thus, the efficiency of human-computer interaction is improved.

The solution provided by this embodiment of this application solves the problem that it consumes too much time to arrange equipment when a user enters or exits a single game due to the fact that articles can be brought in or out of the game.

Before the solution is used, when entering a single game every time, the user needs to take out the articles, select the equipment in the virtual warehouse, use the firearm modification system to customize the virtual firearm, and change roles and the model of the virtual firearm, and then just can enter the single game again, and the steps consume too much time, and are omitted easily.

By applying the solution provided by this embodiment of this application, the virtual items which the user takes out at the previous round but does not want to bring to the next round in the body can be taken out only by directly selecting the plurality of first virtual items suitable for own tactics and clicking one key. Required virtual items are searched and quickly purchased. According to the solution provided by this embodiment of this application, the virtual items can also be automatically worn on the body of the controlled virtual object completely.

By applying the solution provided by this embodiment of this application, the next battle can be started immediately, the preparation speed outside the single game is greatly increased, the user can save time to the content of the single game, and the core playing method difference of the current game and other games can be more concerned.

Figure 10:
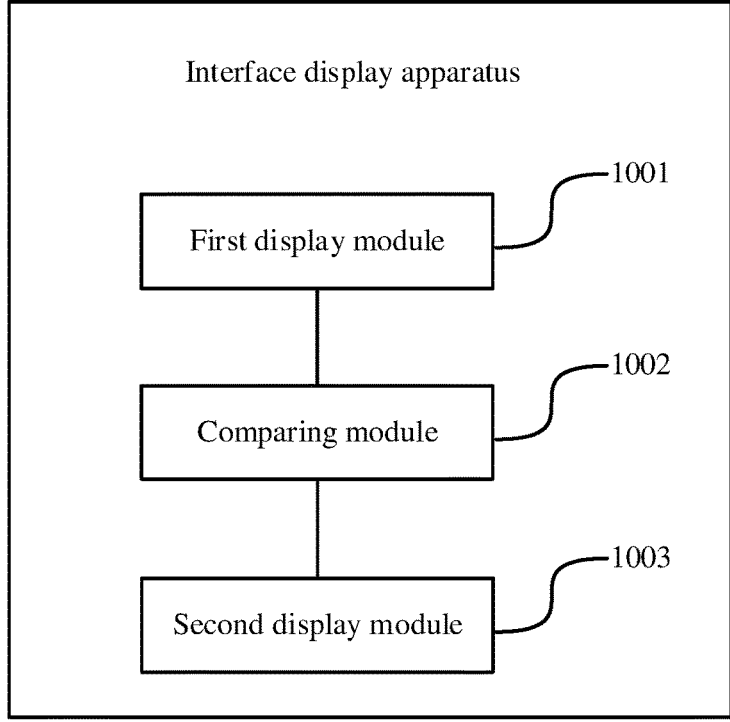
FIG. 10 is a schematic structural diagram of an interface display apparatus according to an embodiment of this application.

FIG. 10 is a schematic structural diagram of an interface display apparatus according to an embodiment of this application, referring to FIG. 10, the apparatus includes: a first display module 1001, a comparing module 1002, and a second display module 1003.

The first display module 1001 is configured to display the virtual item display interface, the virtual item display interface displays a plurality of first virtual items, and the plurality of first virtual items correspond to different parts of the controlled virtual object.

The comparing module 1002 is configured to compare the plurality of first virtual items with second virtual items owned by the controlled virtual object in response to a confirmation operation on the virtual item display interface.

The second display module 1003 is configured to display a virtual item transaction interface in response to any of the first virtual items not being in the second virtual items, where the virtual item transaction interface is configured to obtain the first virtual items.

In some embodiments, the virtual item display interface includes a plurality of slot positions, the plurality of first virtual items are respectively displayed in the plurality of slot positions, and the apparatus further includes:

a virtual item editing interface display module, configured to display the virtual item editing interface in response to a selection operation on any one slot positions in the plurality of slot positions, where the virtual item editing interface is configured to adjust the first virtual items corresponding to the slot positions.

In some embodiments, the virtual item editing interface includes a virtual item selection list, where a plurality of candidate virtual items are displayed in the virtual item selection list, and the plurality of candidate virtual items are virtual items corresponding to the slot positions, and the apparatus further includes:

a candidate virtual item display module, configured to display the candidate virtual item in the slot position in response to any one candidate virtual item in the plurality of candidate virtual items being selected.

In some embodiments, the virtual item editing interface includes a virtual item selection list, where a plurality of candidate virtual items are displayed in the virtual item selection list, and the plurality of candidate virtual items are virtual items corresponding to the slot positions, the apparatus further includes:

a first sub virtual item updating module, configured to display a sub virtual item editing interface in the virtual item editing interface in response to any one candidate virtual item in the plurality of candidate virtual items being selected and the candidate virtual item is a virtual item of a target type, where the sub virtual item editing interface displays a plurality of sub virtual items corresponding to the candidate virtual item, and the virtual item of the target type and the corresponding sub virtual items have a nested relationship. In response to an adjustment operation on any one sub virtual item in the plurality of sub virtual items, the sub virtual item is updated into a sub virtual item corresponding to the adjustment operation.

In some embodiments, the first sub virtual item updating module is configured to display a sub virtual item selection list corresponding to the sub virtual item in response to a selection operation on any one sub virtual item in the plurality of sub virtual items, the sub virtual item selection list displaying a plurality of candidate sub virtual items corresponding to the sub virtual item.

In response to the target sub virtual item in the plurality of candidate sub virtual items being selected, the target sub virtual item is utilized to update the sub virtual item.

In some embodiments, the apparatus further includes:

a list storing module, configured to add the identifier of the first virtual item to a first list in response to any of the first virtual items and any of the second virtual items being the same, where the first list is used for storing the identifiers, which are queried in the second virtual items, of the first virtual items; and to add the identifier of the first virtual item to a second list in response to any one of the first virtual items being different from the second virtual items, where the second list is used for storing the identifiers, which are not queried in the second virtual items, of the first virtual items.

The second display module 1003 is configured to display the virtual item transaction interface in response to that the identifier of any of the first virtual items exists in the second list.

In some embodiments, the virtual item transaction interface displays at least one piece of item information of the first virtual item, and the apparatus further includes:

an adding module, configured to add the first virtual item corresponding to the item information to the virtual warehouse of the controlled virtual object in response to a purchase operation based on any one piece of item information.

In some embodiments, the adding module is configured to compare a first virtual resource quantity with a second virtual resource quantity in response to a purchase operation of any one piece of item information, where the first virtual resource quantity is a quantity of virtual resources indicated by the item information, and the second virtual resource quantity is the quantity of virtual resources owned by an account corresponding to the controlled virtual object.

In response to the second virtual resource quantity being greater than or equal to the first virtual resource quantity, the first virtual items corresponding to the item information are added to the virtual warehouse of the controlled virtual object.

In some embodiments, the virtual item transaction interface displays at least one piece of item information of the first virtual item, and the apparatus further includes:

a temporary pack adding module, configured to add the first virtual item corresponding to the item information to a temporary pack of the controlled virtual object in response to a purchase operation based on any one piece of item information, where the space occupied by the first virtual item corresponding to the item information is greater than the remaining space of the virtual warehouse of the controlled virtual object.

In some embodiments, the at least one piece of item information is item information determined based on recommendation priority, and the recommendation priority includes at least one of the type priority of the virtual resources, the quantity priority of the virtual resources, and the type priority of the virtual items.

In some embodiments, the apparatus further includes:

an updating module, configured to update the virtual items that have been equipped by the controlled virtual object to the plurality of first virtual items in response to the plurality of first virtual items being second virtual items owned by the controlled virtual object.

In some embodiments, the updating module is configured to add third virtual items that have been equipped by the controlled virtual object to the virtual warehouse of the controlled virtual object in response to the plurality of first virtual items being the second virtual items owned by the controlled virtual object, where the third virtual items are virtual items different from the corresponding first virtual items. The plurality of first virtual items in the virtual warehouse are determined as virtual items equipped by the controlled virtual object.

In some embodiments, the apparatus further includes:

a model updating module, configured to update the model of the controlled virtual object by utilizing the models of the plurality of first virtual items.

In some embodiments, the plurality of first virtual items include a virtual item of a target type, the apparatus further including:

a second sub virtual item updating module, configured to respond to the plurality of first virtual items being second virtual items owned by the controlled virtual object, and the controlled virtual object has been equipped with a virtual item of the target type, where the terminal compares the first sub virtual items with the second sub virtual items, the first sub virtual items are sub virtual items corresponding to the virtual item of the target type in the first virtual items, the second sub virtual items are sub virtual items corresponding to the virtual item of the target type, which has been equipped by the controlled virtual object, and the virtual item of the target type and the corresponding sub virtual items have a nested relationship. When the second sub virtual items are the same as the first sub virtual items, the terminal does not update the sub virtual items accommodated by the virtual item of the target type. When second sub virtual items different from the corresponding first sub virtual items exist in the second sub virtual items, the terminal updates the second sub virtual items by utilizing the corresponding first sub virtual items.

In some embodiments, the virtual item of the target type is a container-type virtual item, and the container-type virtual item is configured to accommodate corresponding sub virtual items.

In some embodiments, the apparatus further includes:

an updating module, configured to update the virtual items that have been equipped by the controlled virtual object by utilizing the first virtual items owned by the controlled virtual object in response to a closing operation on the virtual item transaction interface.

In some embodiments, the apparatus further includes:

a third display module, configured to display the virtual item configuration interface, where the virtual item configuration interface is used for configuring the plurality of first virtual items.

The first display module is further configured to display the virtual item display interface in response to a confirmation operation on the virtual item configuration interface.

When the interface display apparatus provided in the foregoing embodiment implements interface display, only division of the foregoing function modules is used as an example for description. In the practical application, the functions may be allocated to and completed by different function modules according to requirements. That is, an internal structure of a computer device is divided into different function modules, to complete all or some of the functions described above. In addition, the interface display apparatus provided by this embodiment and the interface display method embodiment belong to the same concept, and specific implementation processes thereof are described in detail in the method embodiments and are not described herein again.

By means of solutions provided by this embodiment of this application, no virtual items need to be picked one by one for the controlled virtual object, and virtual items are directly selected for the controlled virtual object in batches on the basis of a virtual item display interface. If the controlled virtual object does not have a certain virtual item displayed in the virtual item display interface, the virtual item transaction interface is directly displayed, then corresponding virtual items may be obtained quickly by means of the virtual item transaction interface, and thus, the efficiency of human-computer interaction is improved.

Figure 11:
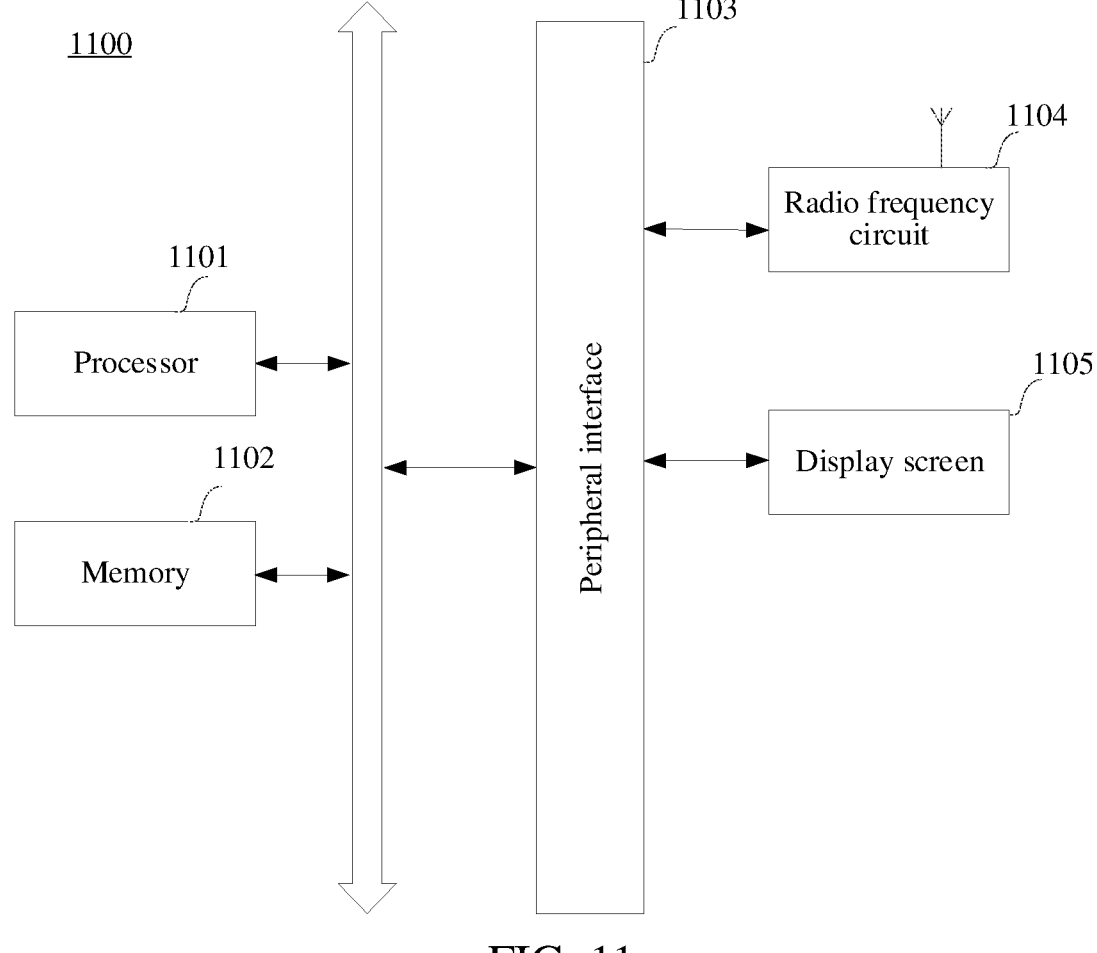
FIG. 11 is a schematic structural diagram of a terminal according to an embodiment of this application.

An embodiment of this application provides a computer device, configured to execute the foregoing method, where the computer device may be implemented as a terminal, and a structure of the terminal is described below:

FIG. 11 is a schematic structural diagram of a terminal according to an embodiment of this application. The terminal 1100 may be: a smartphone, a tablet computer, a laptop computer, or a desktop computer. The terminal 1100 may also be referred to as another name such as user equipment, a portable terminal, a laptop terminal, or a desktop terminal.

In general, the terminal 1100 includes: one or more processors 1101 and one or more memories 1102.

The processor 1101 may include one or more processing cores, for example, a 4-core processor or an 8-core processor. In some embodiments, the processor 1101 may further include an artificial intelligence (AI) processor. The AI processor is configured to process computing operations related to machine learning.

The memory 1102 may include one or more computer-readable storage media. The computer-readable storage medium may be non-transient. The memory 1102 may further include a high-speed random access memory and a nonvolatile memory, for example, one or more disk storage devices or flash storage devices. In some embodiments, the non-transitory computer-readable storage medium in the memory 1102 is configured to store at least one computer program, and the at least one computer program being configured to be executed by the processor 1101 to implement the interface display method provided in the method embodiments of this application.

In some embodiments, the terminal 1100 further includes: a peripheral interface 1103 and at least one peripheral. The processor 1101, the memory 1102, and the peripheral interface 1103 may be connected by means of a bus or a signal cable. Each peripheral may be connected to the peripheral interface 1103 by means of a bus, a signal cable, or a circuit board. Specifically, the peripheral includes: at least one of a radio frequency circuit 1104 and a display screen 1105.

The peripheral interface 1103 may be configured to connect the at least one peripheral related to input/output (I/O) to the processor 1101 and the memory 1102. In some embodiments, the processor 1101, the memory 1102 and the peripheral interface 1103 are integrated on the same chip or circuit board; and in some other embodiments, any one or two of the processor 1101, the memory 1102, and the peripheral interface 1103 may be implemented on a single chip or circuit board. This is not limited in this embodiment.

The radio frequency circuit 1104 is configured to receive and transmit a radio frequency (RF) signal, also referred to as an electromagnetic signal. The radio frequency circuit 1104 communicates with a communication network and other communication devices by means of the electromagnetic signal. The radio frequency circuit 1104 converts an electric signal into an electromagnetic signal for transmission, or converts a received electromagnetic signal into an electric signal. Optionally, the radio frequency circuit 1104 includes: an antenna system, an RF transceiver, one or more amplifiers, a tuner, an oscillator, a digital signal processor, a codec chip set, a subscriber identity module card, and the like.

The display screen 1105 is configured to display a user interface (UI). The UI may include a graph, text, an icon, a video, and any combination thereof. In a case that the display screen 1105 is a touch display screen, the display screen 1105 further has a capability of acquiring a touch signal on or above a surface of the display screen 1105. The touch signal may be inputted to the processor 1101 as a control signal for processing. In this case, the display screen 1105 may be further configured to provide a virtual button and/or a virtual keyboard that are/is also referred to as a soft button and/or a soft keyboard.

A person skilled in the art may understand that the structure shown in FIG. 11 constitutes no limitation on the terminal 1100, and the terminal may include more or fewer components than those shown in the figure, or some components may be combined, or a different component deployment may be used.

In an exemplary embodiment, a computer-readable storage medium, such as a memory including a computer program, is further provided, and the computer program may be executed by a processor to complete the interface display method in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

In an exemplary embodiment, further provided is a computer program product or a computer program including a program code stored in a computer-readable storage medium, the program code is read by a processor of the computer device from the computer-readable storage medium, the program code is executed by the processor to cause the computer device to execute the above-described interface display method.

In some embodiments, a computer program involved in this embodiment of this application may be deployed to be executed on one computer device or on a plurality of computer devices at one site, or on a plurality of computer devices distributed at a plurality of sites and interconnected by a communication network, and the plurality of computer devices distributed at the plurality of sites and interconnected by the communication network may constitute a block chain system.

A person of ordinary skill in the art may understand that all or some of the steps of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. An interface display method, comprising:
displaying, by a terminal, a virtual item display interface, the virtual item display interface displaying a plurality of first virtual items for a controlled virtual object, the plurality of first virtual items being selected in batches and comprising virtual items owned by the controlled virtual object and virtual items not owned by the controlled virtual object;
comparing, automatically by the terminal, the plurality of first virtual items with a plurality of second virtual items in a virtual warehouse owned by the controlled virtual object;
storing, by the terminal, a comparison result in a list manner, wherein the list manner comprises a found list storing identifiers of first virtual items found in the second virtual items and a lack list storing identifiers of first virtual items not found in the second virtual items;
determining, according to the lack list, a first virtual item of the plurality of first virtual items being missing from the plurality of second virtual items; and
displaying, automatically by the terminal, a virtual item transaction interface in response to detecting the first virtual item of the plurality of first virtual items being missing from the plurality of second virtual items, the virtual item transaction interface being configured to obtain the first virtual item.

2. The method according to claim 1, wherein the virtual item display interface comprises a plurality of slot positions, the plurality of first virtual items being respectively displayed in the plurality of slot positions, and the method further comprising:
displaying, by the terminal, a virtual item editing interface in response to a selection operation on a slot position of the plurality of slot positions, the virtual item editing interface being configured to adjust a first virtual item fitted in the selected slot position.

3. The method according to claim 2, wherein the virtual item editing interface comprises a virtual item selection list, the virtual item selection list displaying a plurality of candidate virtual items, and the plurality of candidate virtual items being virtual items corresponding to the selected slot position, and the method further comprising:
displaying, by the terminal, a candidate virtual item in the selected slot position in response to the candidate virtual item being selected from the plurality of candidate virtual items.

4. The method according to claim 3, further comprising:
displaying, by the terminal, a sub virtual item editing interface in the virtual item editing interface in response to the selected candidate virtual item is of a target type, the sub virtual item editing interface displaying a plurality of sub virtual items for the selected candidate virtual item; and
updating, by the terminal, the selected candidate virtual item by a sub virtual item in response to an adjustment operation based on the sub virtual item.

5. The method according to claim 4, wherein the target type is a container-type virtual item, the container-type virtual item being configured to accommodate corresponding sub virtual items.

6. The method according to claim 1, wherein the virtual item transaction interface displays item information of the missing first virtual item.

7. The method according to claim 1, wherein the missing first virtual item is associated with a first virtual resource quantity, the method further comprising:
deducting the first virtual resource quantity from virtual resource owned by an account associated with the controlled virtual object; and
adding the missing first virtual item to the virtual warehouse owned by the controlled virtual.

8. The method according to claim 1, further comprising:
loading a preset template comprising the plurality of first virtual items displayed on the virtual item display interface.

9. The method according to claim 1, further comprising:
loading virtual items equipped by the virtual object as the plurality of first virtual items displayed on the virtual item display interface.

10. The method according to claim 1, further comprising:
saving the plurality of first virtual items displayed on the virtual item display interface as a template.

11. The method according to claim 1, further comprising:
equipping the virtual object with the plurality of first virtual items.

12. The method according to claim 1, wherein the method further comprises:
updating, by the terminal, a visual model of the controlled virtual object by models of the plurality of first virtual items.

13. An interface display apparatus comprising:
a memory storing a plurality of instructions; and
a processor configured to execute the plurality of instructions, wherein upon execution of the plurality of instructions, the processor is configured to:
display a virtual item display interface, the virtual item display interface displaying a plurality of first virtual items for a controlled virtual object, the plurality of first virtual items being selected in batches and comprising virtual items owned by the controlled virtual object and virtual items not owned by the controlled virtual object;

automatically compare the plurality of first virtual items with a plurality of second virtual items in a virtual warehouse owned by the controlled virtual object;

store a comparison result in a list manner, wherein the list manner comprises a found list storing identifiers of first virtual items found in the second virtual items and a lack list storing identifiers of first virtual items not found in the second virtual items;

determine, according to the lack list, a first virtual item of the plurality of first virtual items being missing from the plurality of second virtual items; and automatically display a virtual item transaction interface in response to detecting the first virtual item of the plurality of first virtual items being missing from the plurality of second virtual items, the virtual item transaction interface being configured to obtain the first virtual item.

14. The interface display apparatus according to claim 13, wherein the virtual item display interface comprises a plurality of slot positions, the plurality of first virtual items being respectively displayed in the plurality of slot positions, and wherein the processor, upon execution of the plurality of instructions, is further configured to:

display a virtual item editing interface in response to a selection operation on a slot position of the plurality of slot positions, the virtual item editing interface being configured to adjust a first virtual item fitted in the selected slot position.

15. The interface display apparatus according to claim 13, wherein the processor, upon execution of the plurality of instructions, is configured to cause the virtual item transaction interface to display item information of the missing first virtual item.

16. The interface display apparatus according to claim 13, wherein the missing first virtual item is associated with a first virtual resource quantity, and wherein the processor, upon execution of the plurality of instructions, is further configured to:

deduct the first virtual resource quantity from virtual resource owned by an account associated with the controlled virtual object; and add the missing first virtual item to the virtual warehouse owned by the controlled virtual.

17. The interface display apparatus according to claim 13, wherein the processor, upon execution of the plurality of instructions, is further configured to:

load a preset template comprising the plurality of first virtual items displayed on the virtual item display interface.

18. The interface display apparatus according to claim 13, wherein the processor, upon execution of the plurality of instructions, is further configured to:

load virtual items equipped by the virtual object as the plurality of first virtual items displayed on the virtual item display interface.

19. The interface display apparatus according to claim 13, wherein the processor, upon execution of the plurality of instructions, is further configured to:

save the plurality of first virtual items displayed on the virtual item display interface as a template.

20. A non-transitory computer-readable storage medium storing a plurality of instructions executable by a processor, wherein upon execution by the processor, the plurality of instructions is configured to cause the processor to:

display a virtual item display interface, the virtual item display interface displaying a plurality of first virtual items for a controlled virtual object, the plurality of first virtual items being selected in batches and comprising virtual items owned by the controlled virtual object and virtual items not owned by the controlled virtual object;

automatically compare the plurality of first virtual items with a plurality of second virtual items in a virtual warehouse owned by the controlled virtual object;

store a comparison result in a list manner, wherein the list manner comprises a found list storing identifiers of first virtual items found in the second virtual items and a lack list storing identifiers of first virtual items not found in the second virtual items;

determine, according to the lack list, a first virtual item of the plurality of first virtual items being missing from the plurality of second virtual items; and automatically display a virtual item transaction interface in response to detecting the first virtual item of the plurality of first virtual items being missing from the plurality of second virtual items, the virtual item transaction interface being configured to obtain the missing first virtual item.

* * * * *